United States Patent [19]
Yamada

[11] Patent Number: 5,612,699
[45] Date of Patent: Mar. 18, 1997

[54] VEHICLE RADAR FOR EXCLUDING A VEHICLE CHANGING A LANE FROM TARGETS TO TRACK

[75] Inventor: Yukinori Yamada, Susono, Japan

[73] Assignee: Toyota Jidosha Kabushiki Kaisha, Aichi-ken, Japan

[21] Appl. No.: 581,671

[22] Filed: Dec. 29, 1995

[30] Foreign Application Priority Data

Feb. 8, 1995 [JP] Japan ................................ 7-020797

[51] Int. Cl.⁶ ............................ G01S 13/34; B60R 21/00
[52] U.S. Cl. ................................................................ 342/70
[58] Field of Search .................................. 342/70, 71, 72, 342/95, 107, 159; 364/516

[56] References Cited

U.S. PATENT DOCUMENTS 5,493,302  2/1996  Woll et al. ................................ 342/71

FOREIGN PATENT DOCUMENTS

| 61-259186 | 11/1986 | Japan . |
| 4-343084 | 11/1992 | Japan . |
| 5-142337 | 6/1993 | Japan . |
| 6-174821 | 6/1994 | Japan . |

OTHER PUBLICATIONS

"IEEE Intelligent Vehicles '94", Oct. 26, 1994, Development of a 60 GHz Radar for Rear–end Collision Avoidance, Yamada et al.

*Primary Examiner*—Daniel T. Pihulic
*Attorney, Agent, or Firm*—Kenyon & Kenyon

[57] ABSTRACT

A vehicle radar includes a vehicle in front from being a target when the vehicle shifts to another lane by decreasing certainty of the vehicle as the target. The vehicle radar calculates a relative distance and a relative speed between each of target objects and a vehicle on which the vehicle radar is provided by transmitting forwardly a frequency modulated carrier wave and receiving the carrier wave reflected by each of the target objects. A certainty level represented by probability of existence of the target objects is calculated based on a relationship between a currently detected condition of the target objects and a previously detected condition of the target objects. The certainty level of the target objects is changed when it is determined that the target objects move away from a lane in which the vehicle is moving so that the target objects are excluded from targets to track.

12 Claims, 22 Drawing Sheets

DATA OF ROAD SIDE OBJECT

DATA OF STOPPING VEHICLE

DETERMINATION
OF EXISTENCE FOR
STOPPING OBJECT

DETERMINATION
OF EXISTENCE FOR
MOVING OBJECT

VEHICLE RADAR FOR EXCLUDING A VEHICLE CHANGING A LANE FROM TARGETS TO TRACK

BACKGROUND OF THE INVENTION

1) Field of the Invention

The present invention generally relates to vehicle radar and, more particularly, to vehicle radar for detecting a target object such as a vehicle in front of a radar equipped vehicle or a road side object.

2) Description of the Related Art

Japanese Laid-Open Patent Application No. 61-259186 discloses a detecting apparatus for detecting a position of a vehicle in front (hereinafter, the term "vehicle in front" will refer to a vehicle in front of the radar equipped vehicle). This detecting apparatus projects radar beams in a plurality of directions. A distance to an object (a vehicle in front) is calculated for each of the radar beams so as to measure a direction and distance with respect to the object. If the rate of change of the direction and distance with respect to elapsed time is less than a predetermined value, then the object is determined to be a target to track.

When the vehicle in front slowly shifts to another lane in order to pass another vehicle, the vehicle in front is no longer the target to track. However, the detecting apparatus continues to track the front vehicle since the rate of change of direction and distance in such a case may be less than the predetermined value. Accordingly, there is a problem in that the detecting apparatus unnecessarily tracks the vehicle in front which is no longer the target to track.

SUMMARY OF THE INVENTION

It is a general object of the present invention to provide an improved and useful vehicle radar in which the above-mentioned problem is eliminated.

A more specific object of the present invention is to provide a vehicle radar which excludes a vehicle in front from being a target to track when the vehicle shifts to another lane by decreasing certainty of the vehicle as the target.

In order to achieve the above-mentioned object, there is provided according to the present invention a vehicle radar, provided on a vehicle, for calculating a relative distance and a relative speed between the vehicle and each of the target objects by transmitting forwardly a frequency modulated carrier wave and receiving the carrier wave reflected by each of the target objects, the vehicle radar comprising:

certainty level calculating means for calculating a certainty level, represented by a probability of existence of the target objects, the certainty level being calculated based on a relationship between a currently detected condition of each of the target objects and a previously detected condition of each of the target objects; and certainty level changing means for changing the certainty level of one of the target objects when a determination is made that the one of the target objects move away from a lane on which the vehicle is moving so that the one of the target objects are excluded from targets to track.

In the above-mentioned vehicle radar, the determination is made based on a reflection level of the carrier wave reflected by each of the target objects.

According to the present invention, the certainty level of existence of the target objects can be decreased when it is determined that the target objects, for example, a vehicle in front, moves to another lane. Thus, vehicles corresponding to the target objects having a decreased certainty level can be excluded from the real target objects to track. This results in a reduction of the number of target objects to track since the target objects which are determined to have moved to another lane are excluded. Accordingly, the burden for successive operation for determining danger can be reduced.

According to one aspect of the present invention, as shown in FIG. 1A, the relative distance and the relative speed are calculated by a radar main body (M1). The radar main body supplies the relative distance and the relative speed to the certainty level calculating means (M2) and first certainty level decreasing means (M3) which corresponds o the certainty level changing means. The first certainty level decreasing means (M3) decreases the certainty level of a certain one of the target objects calculated by the certainty level calculating means (M2) when it is determined that the reflection level of the certain one of the target objects is less than a predetermined value and when a rate of change in the reflection level of the certain one of said target objects is less than a first predetermined negative value and when the relative speed between the certain one of the target objects and the vehicle is less than a second predetermined negative value, the rate of change being a negative value when the reflection level is decreasing, the relative speed being a negative value when the certain one of the target objects move away from the vehicle. The first certainty level decreasing means (M3) may set the certainty level of the one of the target objects calculated by the certainty level calculating means (M2) to be equal to 0 when the determination is made.

According to another aspect of the present invention, as shown in FIG. 1B, the relative distance and the relative speed are calculated by the radar main body (M1). The radar main body supplies the relative distance and the relative speed to the certainty level calculating means (M2) and second certainty level decreasing means (M4) which corresponds to the certainty level changing means. The second certainty level decreasing means (M4) determines if a lane change of the target objects occurs based on the reflection level of a first one of the target objects and the reflection level of a second one of the target objects, the first one of the target objects being positioned between the second one of the target objects and the radar equipped vehicle. The first one of the target objects is closest to the second one of the target objects among the target objects. The second certainty level decreasing means (M4) decreases the certainty level of the first one of the target objects when it is determined that the first one of the target objects approaches to the second one of the target objects within a predetermined distance. The determination is made based on the relative distance and relative speed of the first one and the second one of the target objects. The first one of the target objects may be closest to the radar equipped vehicle among the target objects. The second certainty level decreasing means (M4) may set the certainty level of the first one of the target objects calculated by the certainty level calculating means (M2) to be equal to 0 when the determination is made.

According to another aspect of the present invention, as shown in FIG. 1C, the relative distance and the relative speed are calculated by the radar main body (M1). The radar main body supplies the relative distance and the relative speed to the certainty level calculating means (M2) and third certainty level decreasing means (M5) which corresponds to the certainty level changing means. The third certainty level decreasing means (M5) decreases the certainty level of one of the target objects when it is determined that a differential value of the relative distance of the one of the target objects is greater than the relative speed of the one of said target objects. The third certainty level decreasing means (M5) may set the certainty level of the one of the target objects calculated by the certainty level calculating means (M2) to be equal to 0 when the determination is made.

Other objects, features and advantages of the present invention will become more apparent from the following detailed description when read in conjunction with the accompanying drawings.

DETAILED DESCRIPTION OF THE PREFERRED EMBODIMENTS

Figure 1A:
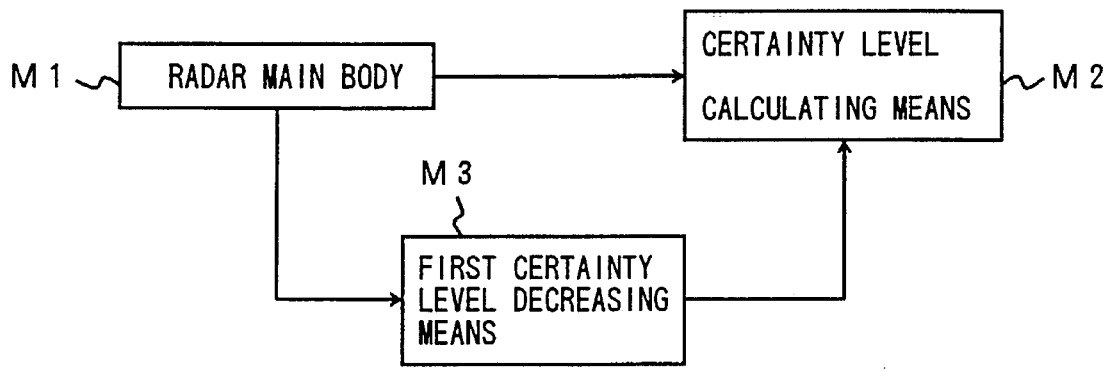
FIGS. 1A, 1B and 1C are block diagrams for explaining the principles of the present invention.
Figure 1B:
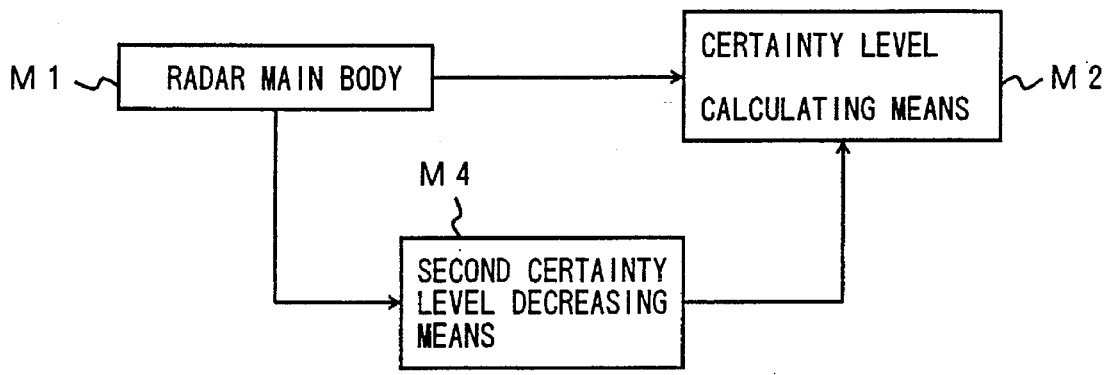
Figure 1C:
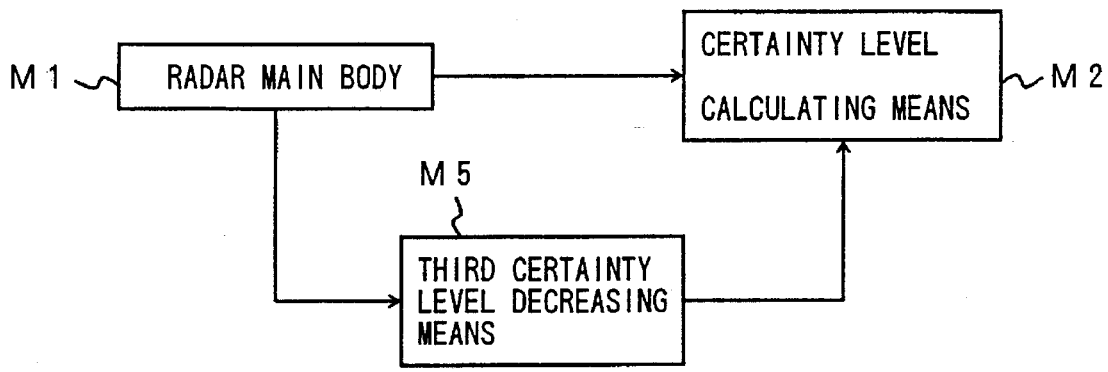
Figure 2:
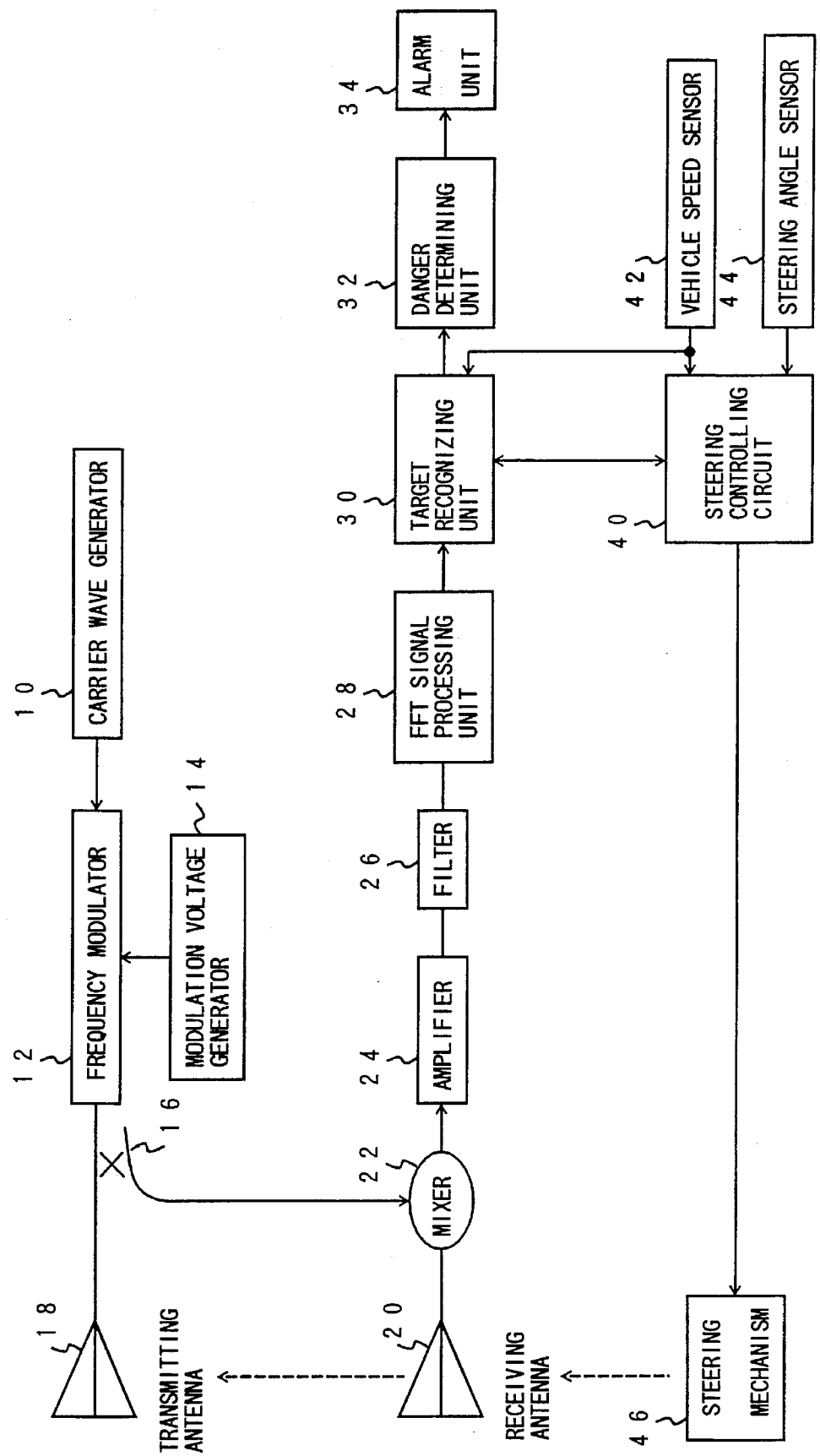
FIG. 2 is a block diagram of a vehicle radar according to the present invention.
Figure 3:
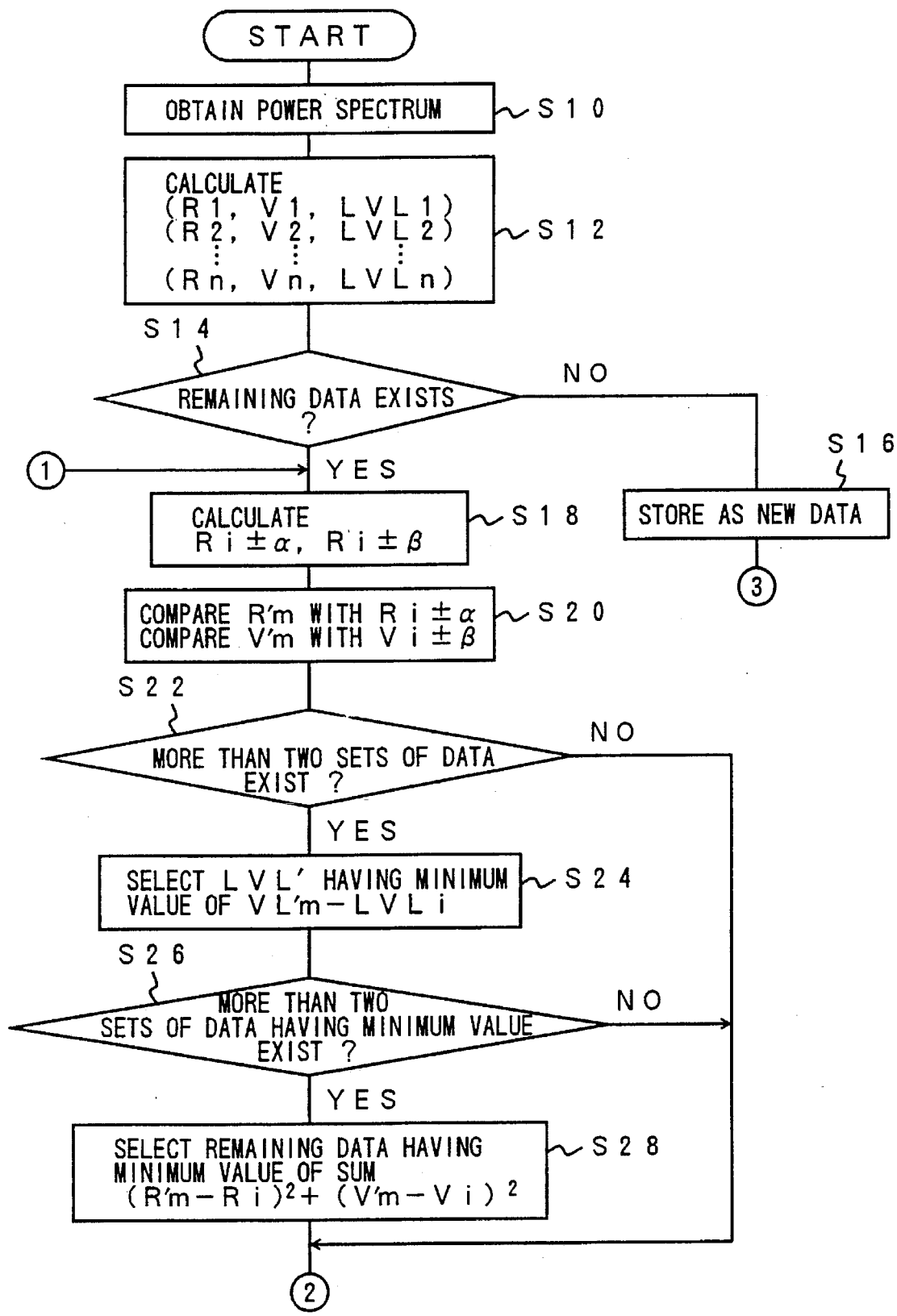
FIGS. 3 through 6 are parts of a flowchart of a first embodiment of a recognizing operation according to the present invention.
Figure 4:
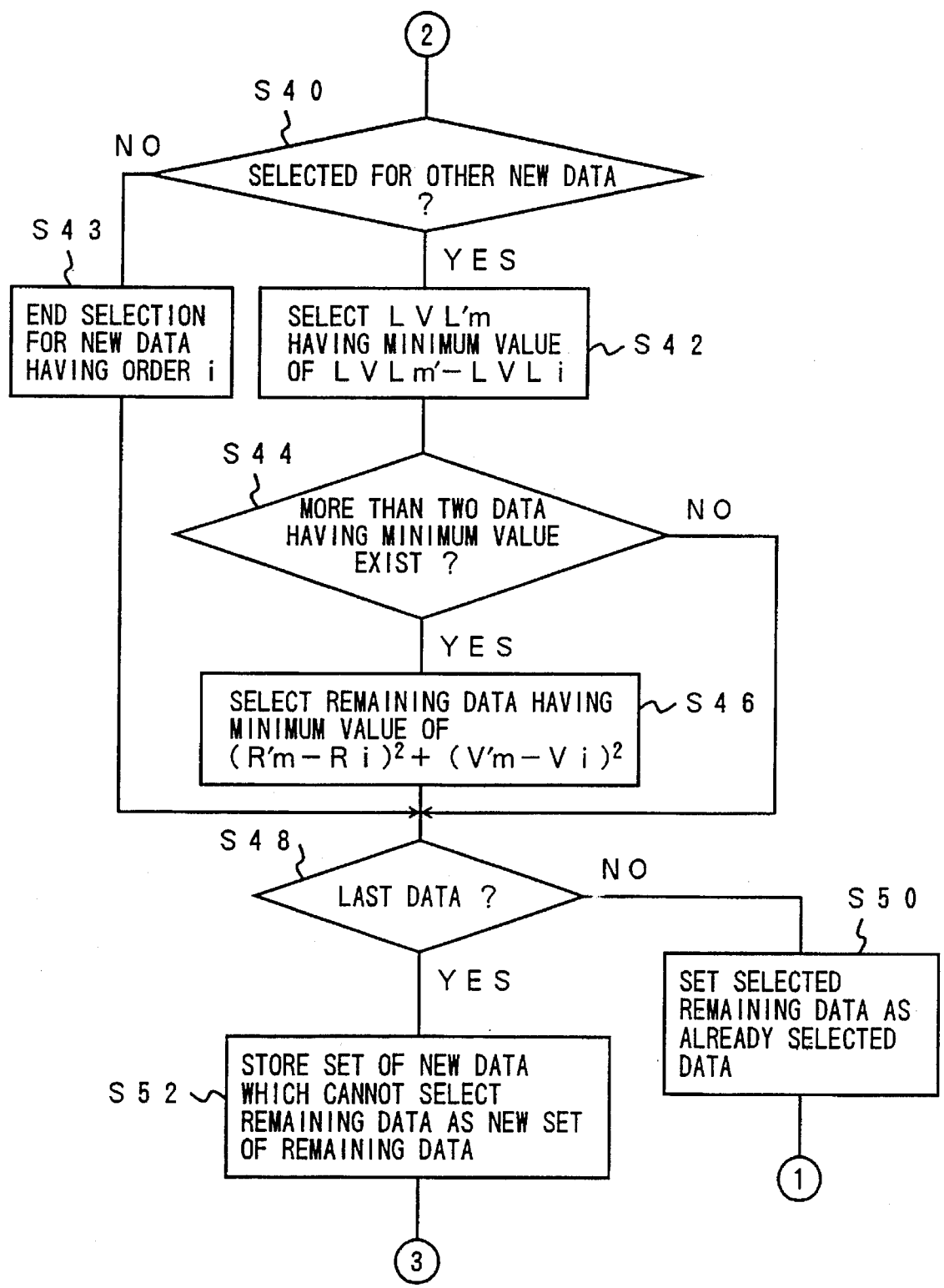

FIG. 2 is a block diagram of a radar system provided on a vehicle, hereinafter referred to as vehicle radar according to the present invention. In FIG. 2, a carrier wave generator 10, a frequency modulator 12, modulation voltage generator 14, a directional coupler 16 and transmitting antenna 18 together constitute a transmitter circuit. The carrier wave generator 10 generates a carrier wave and outputs the carrier wave to the frequency modulator 12. The modulation voltage generator 14 generates a triangular waveform having an amplitude varying in a triangular shape. The triangle wave is supplied to the frequency modulator 12 as a modulation wave. The carrier wave supplied to the frequency modulator 12 is frequency modulated by the triangular wave so as to generates a transmission signal having a frequency varying in a triangular shape with respect to elapsed time. The transmission signal is sent to the transmitting antenna 18 and emitted toward an object to be detected. Additionally, a part of the transmission signal is supplied to a mixer 22 of a receiver circuit.

The receiver circuit comprises a receiving antenna 20, a mixer 22, an amplifier 24, a filter 26, a fast Fourier transform (FFT) signal processing unit 28, a target recognizing unit 30, a danger determining unit 32 and an alarm unit 34. A reflected wave from the object to be detected is received by the receiving antenna 20, and sent to the mixer 22. The mixer 22 couples the reception signal supplied by the antenna 20 and the part of the transmission signal supplied by the directional coupler 16 by means of differential calculation so as to generate a beat signal. The beat signal is amplified by the amplifier 24, and then supplied to the FFT signal processing unit 28 via the filter 26. The FFT signal processing unit 28 derives a power spectrum of each of the frequency increasing part and the frequency decreasing part from the beat signal, and supplies the power spectrum to the target recognizing unit 30.

The target recognizing unit 30 detects a peak of the power spectrum of the frequency increasing part and the frequency decreasing part so as to form a pair of peaks with respect to each of the targets. Then, a relative speed frequency fd and a distance frequency fr are obtained from the peak frequency fup of the frequency increasing part and the peak frequency fdown of the frequency decreasing part by the following equations.

$$fd=(fdown-fup)/2 \qquad (1)$$

$$fr=(fdown+fup)/2 \qquad (2)$$

Then, a relative distance R and a relative speed V are calculated by the following equations.

$$fd=2\cdot V/C\cdot f0 \qquad (3)$$

$$fr=4\cdot fm\cdot df/C\cdot R \qquad (4)$$

Where,

C is the velocity of light;

f0 is the center frequency;

fm is the modulation frequency;

df is the width of frequency shift.

Thereafter, the danger determining unit 32 compares the calculated relative frequency R with a predetermined safe distance. The safe distance may be calculated in accordance with driving conditions of the vehicle. If the relative distance is less than the safe distance, it is determined that the vehicle is in a danger condition, and thus the alarm unit 34 provides a warning to the driver.

Additionally, the relative speed R is supplied to a steering controlling circuit 40. A vehicle speed $V_s$ and a steering angle $\Theta_H$ are also supplied to the steering controlling circuit 40 by a vehicle speed sensor 42 and a steering angle sensor 44, respectively. The steering control circuit 40 calculates a radius r of a curve and a steering angle $\Theta_s$ by the following equations. The steering angle $\Theta_s$ is a rotation angle of the transmitting antenna 18 and the receiving antenna 20.

$$r = (1 + K1 \times V_s^2) \times K2 / \Theta_H \qquad (5)$$

$$\Theta_s = \sin^{-1}(R/2r) \qquad (6)$$

Where K1 and K2 are constants.

The steering angle $\Theta_s$ is set to 0 degree when the antennae 18 and 20 are oriented in the direction of movement of the vehicle; the left side of the vehicle is a positive side and the right side is a negative side. The steering control circuit 40 controls a steering mechanism 46, which rotates the transmitting antenna 18 and the receiving antenna 20, in accordance with the steering angle $\Theta_s$ calculated by the equation (6). The vehicle speed $V_s$ is also supplied to the target recognizing unit 30.

FIGS. 3 through 6 are parts of a flowchart of a first embodiment of a recognizing operation performed by the target recognizing unit 30. The recognizing operation is performed every few tens of milliseconds. When the recognizing operation is started, the power spectrum is obtained, in step S10, from the FFT signal processing unit 28. After that, in step S12, the relative distance R and the relative speed V are calculated with respect to each of the target objects by the equations (1) through (4). A reflection level LVL, which is an average level of the pair of peaks, is also calculated with respect to each of the target objects. The relative speed V is set to a positive value when the vehicle approaches the target. The reflection level LVL may be calculated for the peak of the frequency increasing part and the peak of the frequency decreasing part. The average level is used for simplifying the calculation. It should be noted that the number n of the target objects may be up to five if tracking is performed for only vehicles. However, the number may be about twenty if there is reflection from road side objects.

In step S14, it is determined whether or not a set of data for a target object exists, that is, whether or not a target object has been set in the previous operation. Hereinafter, a set of data already in existence is referred to as a set of remaining data. Each set of remaining data corresponds to each target object. If there is no set of remaining data, the routine proceeds to step S16. In step S16, the values of Ri, Vi and LVLi (i=1 to n) calculated in step S12 are stored as sets of new data for new targets, and then the routine proceeds to step S60 shown in FIG. 5. Each set of new data corresponds to each new target initially set in the present operation. Basically, probability of existence of the new targets is assumed to be constant, that is, for example, about 5%.

If remaining data exists, a range Ri±α and a range Vi±β is calculated for each of the sets of new data, that is, for the new target i (i=1 to n). The ranges ±α and ±β are determined by considering a limit value for a rapid acceleration or deceleration of the vehicle and an error in the operation performed by the vehicle radar. In step S20, the range Ri±α and the range Vi±β for the new target i are compared with a relative distance R'm and a relative distance V'm for all sets of remaining data. The comparison with all sets of remaining data is made for all of the new targets. It should be noted that a range may be provided to each set of remaining data so as to compare with the set of new data. Additionally, the next R'm and V'm may be assumed by the increase in dR'm and dV'm. The next R'm and V'm are used for the above-mentioned remaining data.

In step S22, it is determined whether or not more than two sets of remaining data exist in the range Ri±α or the range Vi±β. That is, whether or not more than two targets are found within the range. If more than two sets of remaining data exist, the routine proceeds to step S24. If more than two sets of remaining data do not exist, the routine proceeds to step S40 shown in FIG. 5. In step S24, differences between the reflection level LVLi of the new data and each of the reflection levels LVL'm, LVL'p, . . . of the sets of remaining data within the range are compared with each other. The set of remaining data having the minimum value of the difference is selected. It is then determined, in step S26, whether or not more than two sets of remaining data exist which have the minimum value. If there are more than two sets of remaining data having the minimum value, the routine proceeds to step S28. If there are not more than two sets of remaining data having the minimum value, the routine proceeds to step S40. The reflection level is compared for the reason that the reflection level of the same target does not change when the period of detection is short.

In step S28, a sum of a square of the difference between the relative distance of the remaining data and the relative distance of the new data and a square of the difference between the relative speed of the remaining data and the relative speed of the new data is obtained for each of the sets of remaining data having the minimum value of the difference. For example, a value of $(R'm-Ri)^2 + (V'm-Vi)^2$ is calculated. Then, the set of remaining data having the minimum value of the sum is selected. Thereafter, the routine proceeds to step S40 shown in FIG. 4. In step S40, it is determined whether or not the selected set of remaining data has already been selected for other new targets (other sets of new target). If it is selected for other new targets, the routine proceeds to step S42. If it is not selected for other new targets, the routine proceeds to step S43. In step S43, the operation for the set of new data having an order of i is ended, and the routine proceeds to step S48.

In step 42, a difference between the reflection level LVL'm of the selected remaining data and each of the reflection levels LVLi, LVLj, . . . of the plurality of new data which selected the particular set of remaining data is obtained. The set of new data having the minimum value of the difference is selected. Additionally, it is determined, in step S44, whether or not more than two sets of new data having the minimum value exist. If affirmative, the routine proceeds to step S46. If negative, the routine proceeds to step S48.

In step S46, a sum of a square of the difference between the relative distance of the remaining data and the relative distance of the new data and a square of the difference between the relative speed of the remaining data and the relative speed of the new data is obtained for the each of the sets of new data having the minimum value of the difference. For example, a value of $(R'm-Ri)^2 + (V'm-Vi)^2$ is calculated. Then, the set of remaining data having the minimum value of the sum is selected.

Thereafter, it is determined, in step S48, whether or not the set of new data for the new target is the last set of new data. If it is not the last set of new data, the routine proceeds to step S50 so as to set the remaining data finally selected in step S28 as a selected set of remaining data, and then the routine returns to step S18 to repeat the above-mentioned process. On the other hand, if it is determined, in step S48, that the set of new data currently processed is the last set of new data, the routine proceeds to step S52 so as to store the set of new data, which cannot select one of the sets of remaining data, as a new set of remaining data.

Figure 5:
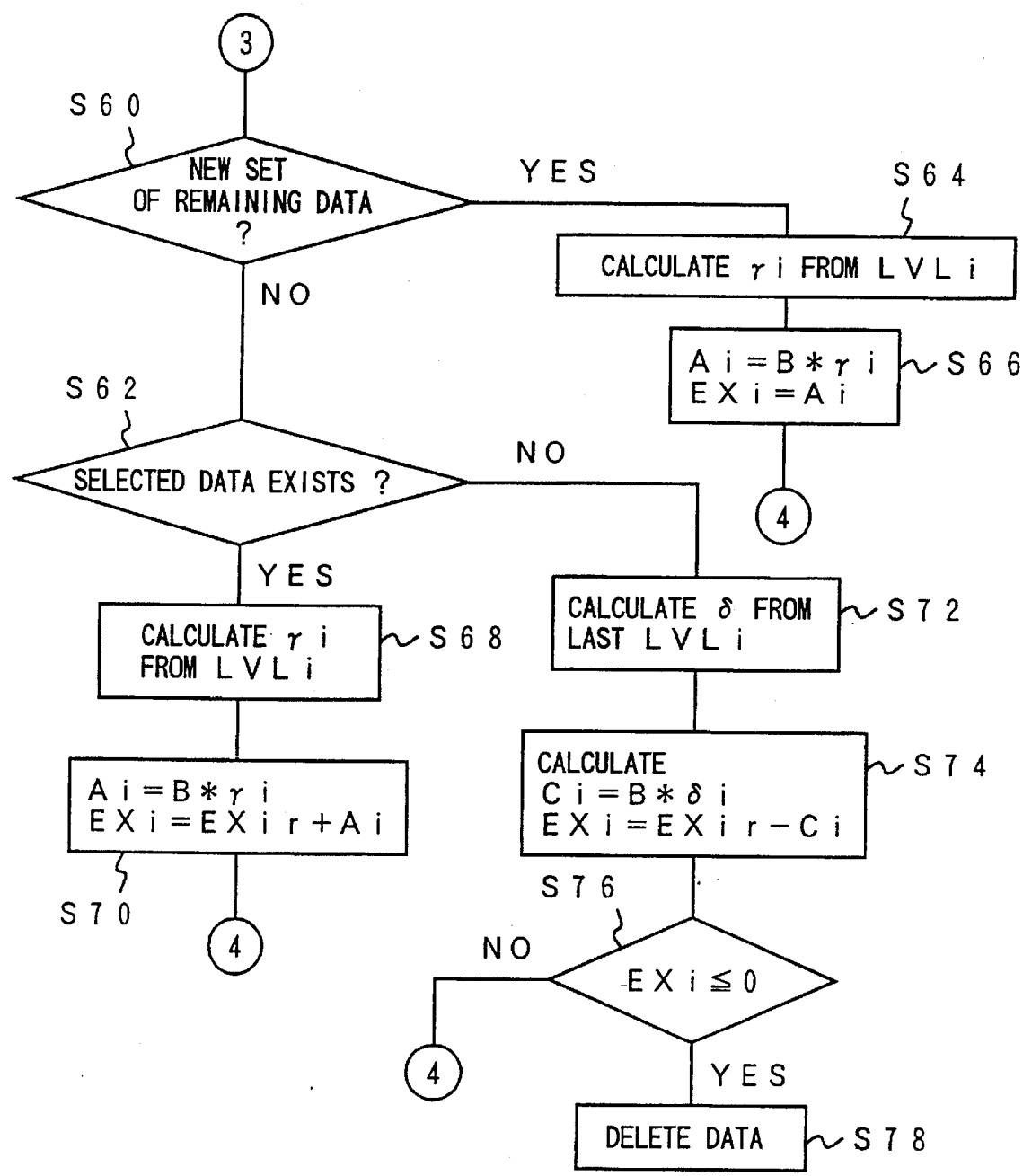
Figure 7:
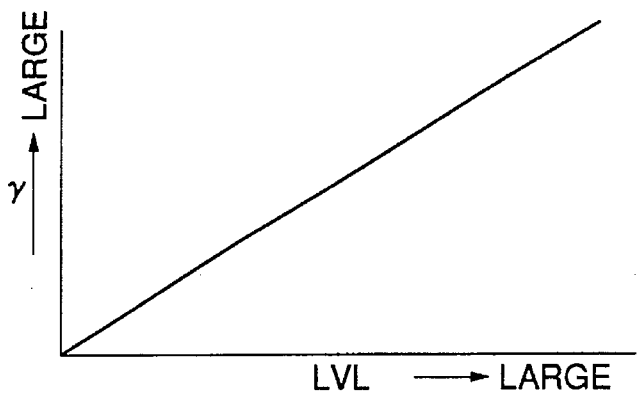
FIG. 7 is a graph showing a relationship between a reflection level and a correction factor.

In step S60 shown in FIG. 5, it is determined whether or not the set of remaining data is the new set of remaining data for all of the sets of remaining data. If one of the sets of remaining data is determined to be the new set of remaining data, that is, if the one of the sets of remaining data corresponds to the target i which has been initially set in the operation currently performed, the routine proceeds to step S64. In step S64, a correction factor Ti is determined by the reflection level LVLi by referring to a map representing a graph shown in FIG. 7. In millimeter wave radar, the reflection level LVL is determined by the capability of the sensor and the size of the target object. Thus, rate of increase in probability of existence is increased by increasing the correction factor T since less error occurs when the reflection level is high. After that, in step S66, the probability of existence EXi is calculated as to level of certainty by the following equations (7).

$$Ai = B \times \pi i, \ EXi = Ai \tag{7}$$

Where B is a predetermined value such as 5%. The probability of existence EXi is stored together with Ri, Vi and LVLi, and then the routine proceeds to step S80.

If it is determined, in step S60, that one of the set of remaining data is not the new set of remaining data, the routine proceeds to step S62. It is determined, in step S62, whether or not the set of remaining data is selected by one of the set of new data for all of the sets of remaining data. If it is determined that the set of remaining data is selected by one the set of new data, that is, if the set of remaining data corresponds to the target i which has been detected in the previous operation, the probability of existence is set higher as the target is detected continuously for a long period of time. In order to achieve this, the correction factor Ti is determined by the reflection level LVLi by referring to the map representing the graph shown in FIG. 7. The probability of existence is calculated, in step S70, by the following equations (8), and then the routine proceeds to step S80.

$$Ai = B \times \pi i, \ EXi = EXir + Ai \tag{8}$$

Where EXir is the probability of existence stored in the last operation.

Figure 8:
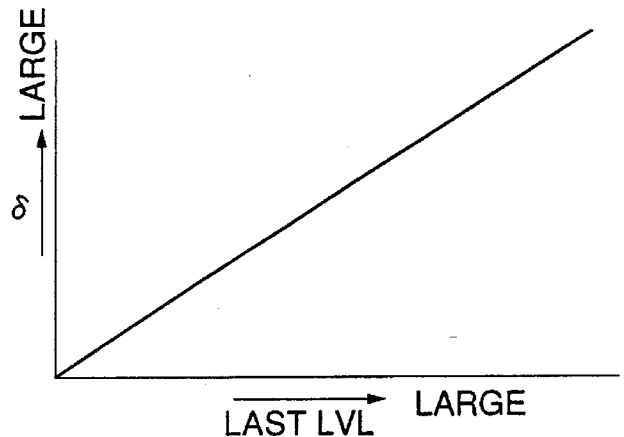
FIG. 8 is a graph showing a relationship between the last reflection level and a correction factor.

If it is determined, in step S62, that the set of remaining data is selected by none of the sets of new data, that is, if the target i is lost, the routine proceeds to step S72. In step S72, a correction factor δi is determined by the reflection level LVLi stored in the last operation by referring to a map representing a graph shown in FIG. 8. The graph show in FIG. 8 indicates that if the LVLi stored in the last operation is large, the probability of losing the target i is small. This indicates increased probability of non-existence of the target i in front of the vehicle due to such reason as the target (vehicle) has shifted to another lane. After calculating the correction factor δi, the routine proceeds to step S74 so a to calculate the probability of existence EXi by the following equations (9).

$$Ci = B \times \delta i, \ EXi = EXir - Ci \tag{9}$$

Thereafter, in step S76, it is determined whether or not EXi calculated by the equations (9) is equal to or less than 0. If EXi is equal to or less than 0, the routine proceeds to step S78 so as to delete the set of remaining data corresponding to the target i. If EXi is greater than 0, the routine proceeds to step S80.

Figure 6:
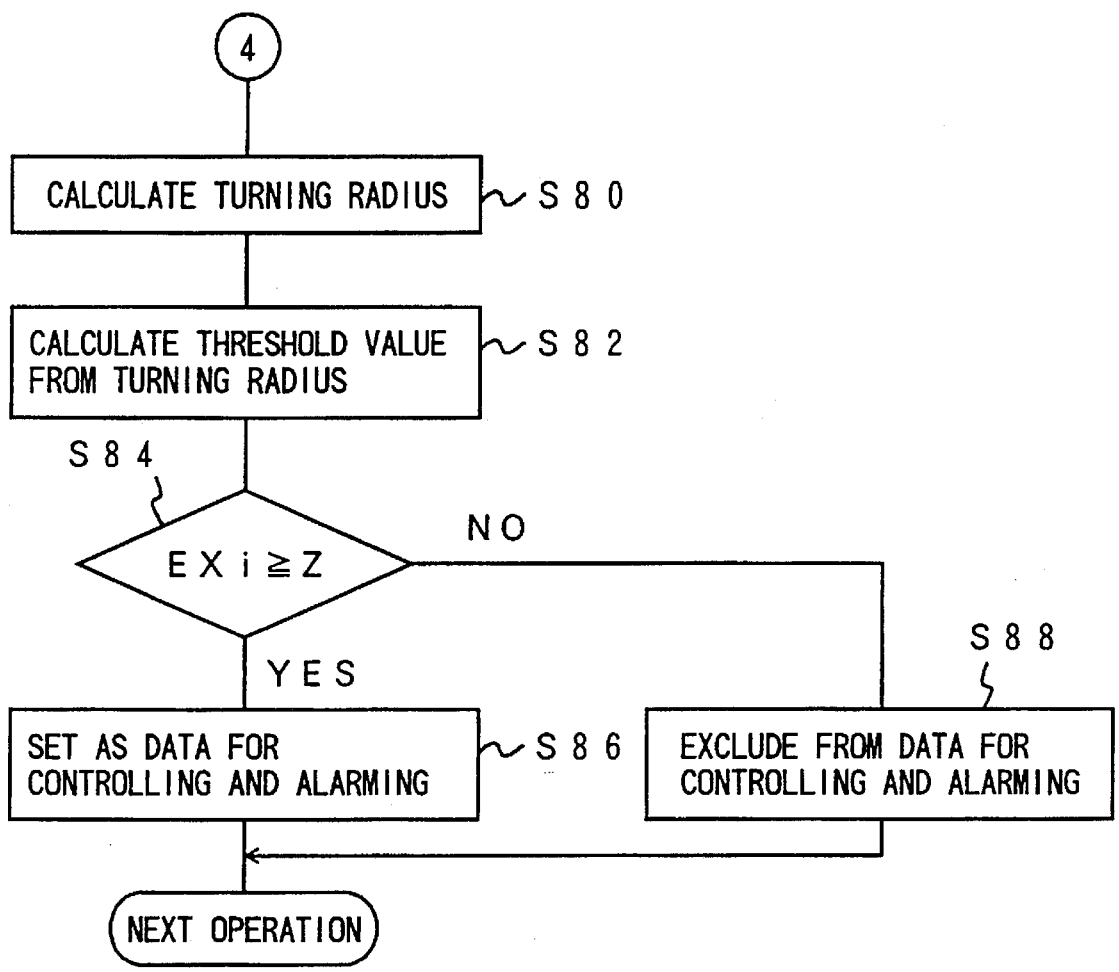
Figure 9:
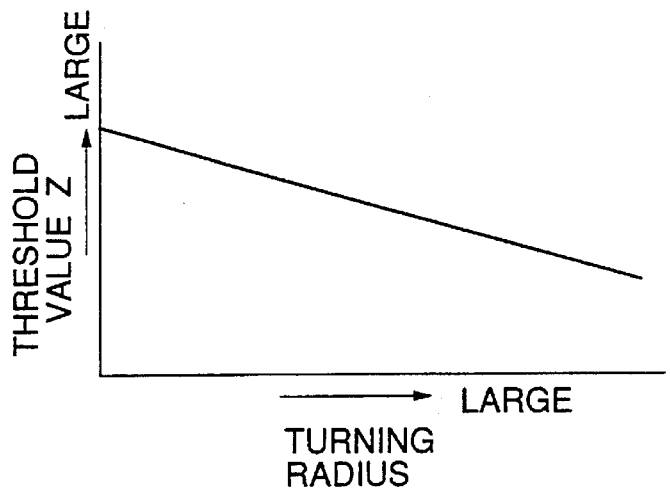
FIG. 9 is a graph showing a relationship between a turning radius and a threshold value.

In step S80 shown in FIG. 6, a turning radius of the vehicle is calculated by a steering angle or a yaw rate. Then, a threshold value Z is calculated, in step S82, from the turning radius by referring to the map representing a graph shown in FIG. 9. When the vehicle is in a straight lane, a width of the radar beam is narrowed to correspond to approximately the width of the lane. Thus, a probability of erroneous detection is low even if the probability of existence is low. However, when the vehicle is in a curve, the probability of detecting an adjacent vehicle is increased even if the radar beam is deflected. In order to eliminate this problem, the threshold value Z is increased as the turning radius decreases.

After that, in step S84, it is determined whether or not the probability of existence EXi is equal to or greater than the threshold value Z for all of the targets i. If EXi is equal to or greater than Z, the routine proceeds to step S86 to set the set of data corresponding to the target i as an object for controlling and alarming, and then the routine proceeds to the next process. If EXi is smaller than Z, the routine proceeds to S88 to exclude the target i from the object for controlling and alarming, and then the routine proceeds to the next process.

According to the above-mentioned operation, a target object such as a road side object or a vehicle in the adjacent lane, which exists in front of the vehicle for a short time, can be eliminated. Thus, losing a real target due to such noise can be prevented. In the above-mentioned embodiment, since the reflection level is used for calculating the probability of existence, a precise determination is provided. The above-mentioned steps S66 and S74 correspond to the certainty level calculating means M2. It should be noted that the certainty level is represented by the probability of existence of the target objects. However, the certainty level may be forcibly changed when some conditions are met, as described later.

The probability of existence of a target object can be calculated by using the reflection level LVL in accordance with capability of the sensor. The size of a reflecting cross-section of the target object is a major factor influencing the change in the reflection level. The reflecting cross-section varies according to size and material of the target object. For example, the probability of existence of a large truck is a high value even if the truck is at a relatively long distance while the probability of existence of a motorcycle does not become high even if the motorcycle is at a close range. Thus, the motorcycle does not become an object for controlling or alarming unless the motorcycle approached closer than a large object such as a truck. In order to compensate for this, physical danger of the target object can be reflected to the probability of existence by changing the probability of existence according to the distance between vehicles and a speed of the vehicle. This reduces the possibility of losing a small object such as a motorcycle. Second and third embodiments described below relates to this matter.

Figure 10:
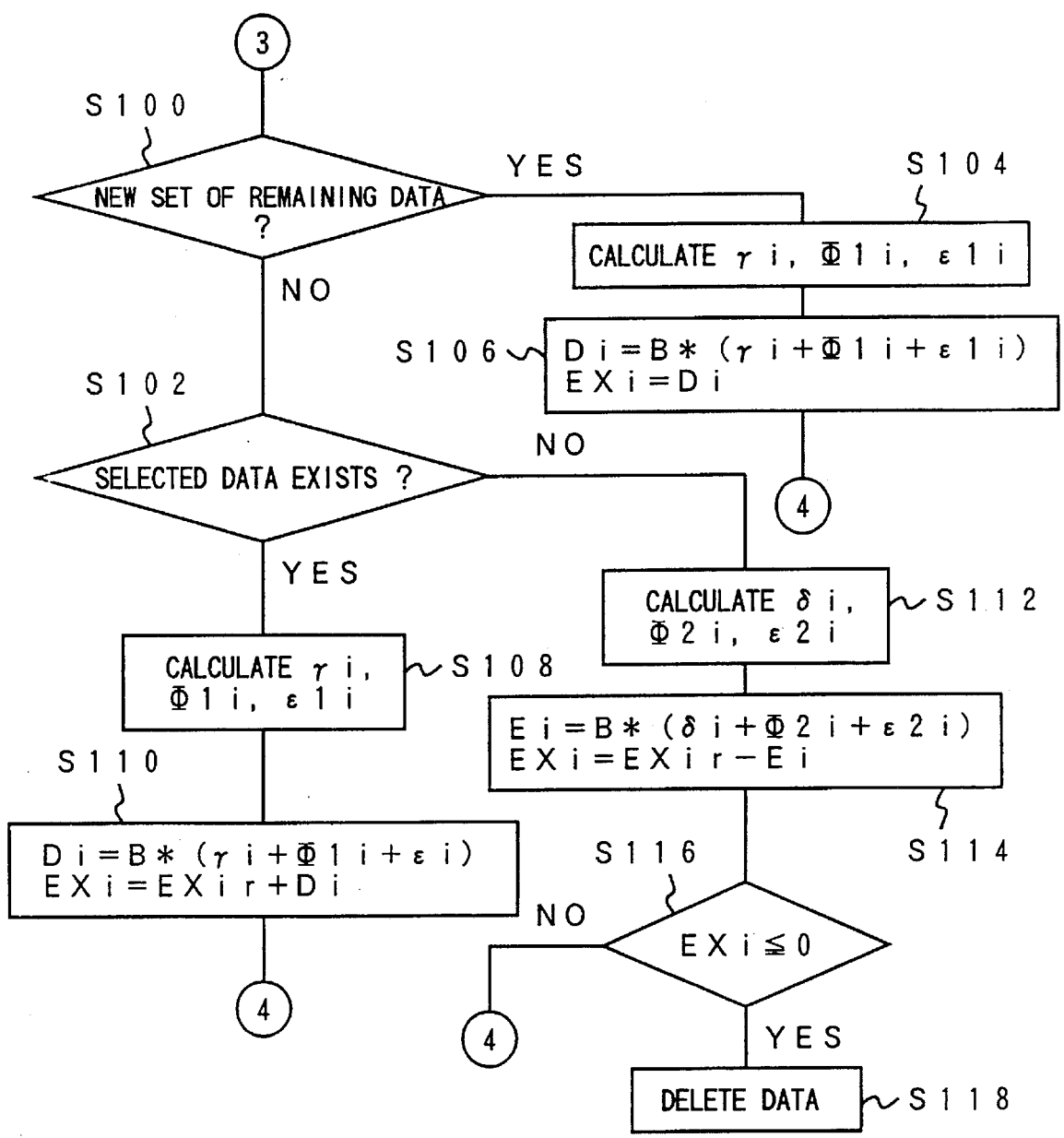
FIG. 10 is a flowchart of a part of a second embodiment of the recognizing operation according to the present invention.

FIG. 10 is a flowchart of a part of an operation performed in the second embodiment according to the present invention. The operation shown in FIG. 10 is preformed instead of a part of the operation of the first embodiment shown in FIG. 5.

In step S100 shown in FIG. 10, it is determined whether or not the set of remaining data is the new set of remaining data for all of the sets of remaining data. If one of the sets of remaining data is determined to be the new set of remaining data, that is, if the one of the sets of remaining data corresponds to the target i which has been initially set in the operation currently performed, the routine proceeds to step S104. In step S104, a correction factor τi is calculated by the reflection level LVLi by referring to the map representing the graph shown in FIG. 7. Additionally, a correction factor Φ1 i is calculated by the relative distance Ri of the set of new data by referring to a map representing the graph shown in FIG. 11. Further, a correction factor ε1 i is calculated by the vehicle speed SPD by referring to the map representing the graph shown in FIG. 12.

Figure 11:
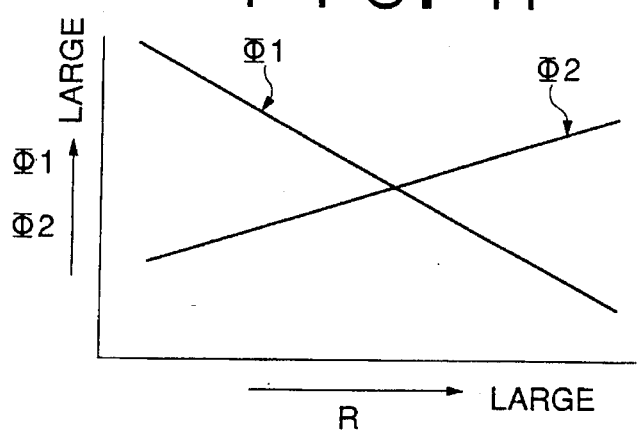
FIG. 11 is a graph showing a relationship between a relative distance and correction factors.
Figure 12:
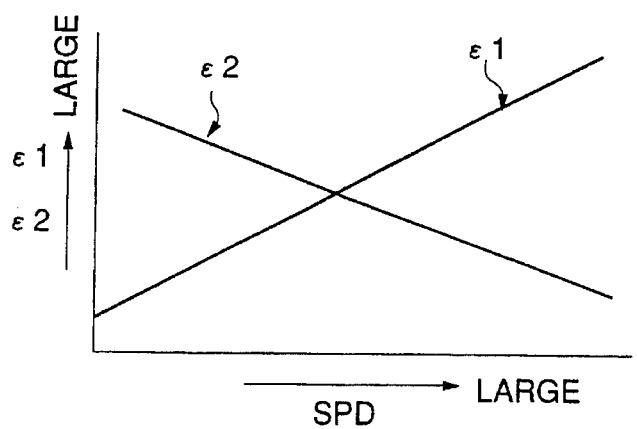
FIG. 12 is a graph showing a relationship between a vehicle speed and correction factors.

In FIG. 11, the correction factor Φ1 is increased as the relative distance is decreased, and contrary, a correction factor Φ2 is decreased as the relative distance is decreased. Additionally, in FIG. 12, the correction factor ε1 is increased as the vehicle speed SPD is increased, and contrary, a correction factor ε2 is decreased as the vehicle speed SPD is increased.

Thereafter, in step S106, probability of existence EXi is calculated by the following equations (10).

$$Di=Bx(\tau i+\Phi 1i+\epsilon 1i), EXi=Di \qquad (10)$$

The probability of existence EXi is stored together with Ri, Vi and LVLi, and then the routine proceeds to step S80.

If it is determined, in step S100, that one of the set of remaining data is not the new set of remaining data, the routine proceeds to step S102. It is determined, in step S102, whether or not the set of remaining data is selected by one of the set of new data for all of the sets of remaining data. If it is determined that the set of remaining data is selected by one of the sets of new data, that is, if the set of remaining data corresponds to the target i which has been detected in the previous operation, the probability of existence is set higher as the target is detected continuously for a long time period. In order to achieve this, the correction factors τi, Φ1i and ε1i are calculated by the reflection by referring to the maps representing the graphs shown in FIGS. 7, 11 and 12, respectively. The probability of existence is calculated, in step S110, by the following equations (11), and then the routine proceeds to step S80.

$$Di=Bx(\tau i+\Phi 1i+\epsilon 1i), EXi=EXir+Di \qquad (11)$$

If it is determined, in step S102, that the set of remaining data is selected by none of the sets of new data, that is, if the target i is lost, the routine proceeds to step S112. In step S112, the correction factors δi, Φ2i and ε2i are calculated by the reflection level LVLi, the relative distance Ri and the vehicle speed SPD of the set of remaining data corresponding to the target object which was initially detected in the last operation by referring to the maps representing the graphs shown in FIGS. 8, 11 and 12, respectively. It should be noted that the correction factor Φ2 shown in FIG. 11 is decreased as the relative distance R is decreased, and the correction factor ε2 is decreased as the vehicle speed SPD is increased so as to reflect a dangerous state to the probability of existence. Thereafter, in step S114, the probability of existence EXi is calculated by the following equations (12).

$$Ei=Bx(\delta i+\Phi 2i+\epsilon 2i), EXi=EXir-Ei \qquad (12)$$

Thereafter, in step S116, it is determined whether or not EXi calculated by the equatitons (12) is equal to or less than 0. If EXi is equal to or less than 0, the routine proceeds to step S118 so as to delete the set of remaining data corresponding to the target i. If EXi is greater than 0, the routine proceeds to step S80. The above-mentioned steps S106 and S114 correspond to the certainty level calculating means M2.

A description will now be given of the third embodiment of the recognizing operation according to the present invention. In the third embodiment, a small target object such as a motorcycle can be positively recognized by learning the probability of existence of such target. The learning is performed for reducing the difference in probability of losing the target object. The difference is produced due to a difference in type of the target object.

Figure 13:
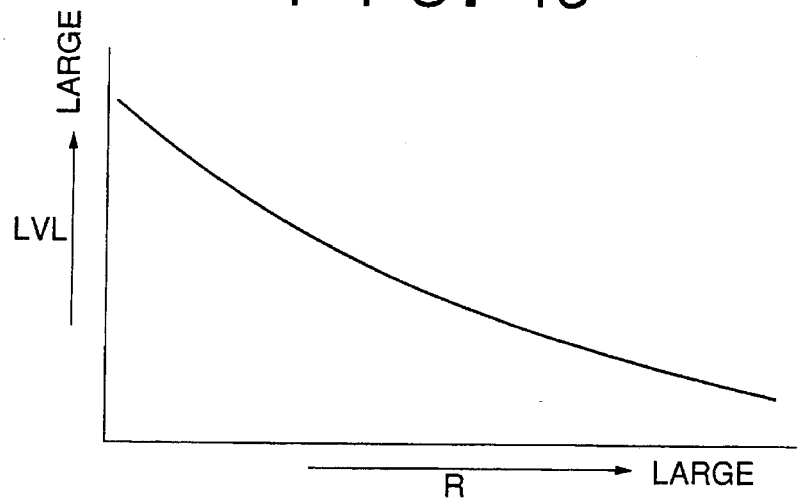
FIG. 13 is a graph showing a relationship between the relative distance and the reflection level.
Figure 14:
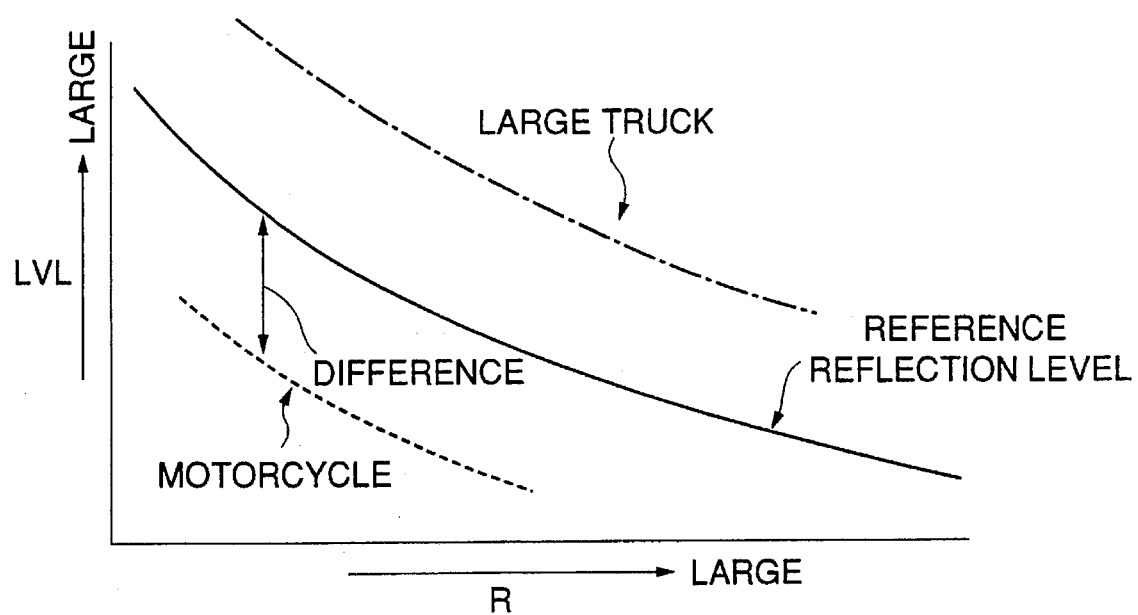
FIG. 14 is a graph showing a reference reflection level.

The reflection level of a radar beam from the same object varies in accordance with the relative distance R as shown in FIG. 13. A map representing a reference reflection level for a passenger car indicated by a solid line shown in FIG. 14 is prepared beforehand by experiences or by simulation. This is because a number of passenger cars dominate on a general road. The reflection level for a large vehicle such as a truck is higher, on average, than the reference reflection level as indicated in a chain line shown in FIG. 14. The reflection level for a small vehicle such as a motorcycle indicated by a dashed line is lower, on average, than the reference reflection level. Thus, a difference between the reference reflection levels is averaged until a time period in which the probability of existence is greater than 0 exceeds a predetermined time period. The average value is added to a current reflection level so as to obtain a corrected value of an increasing rate of the probability of existence. If the target object is lost, a correction of a decreasing rate is performed with respect to the original reflection level.

Figure 15:
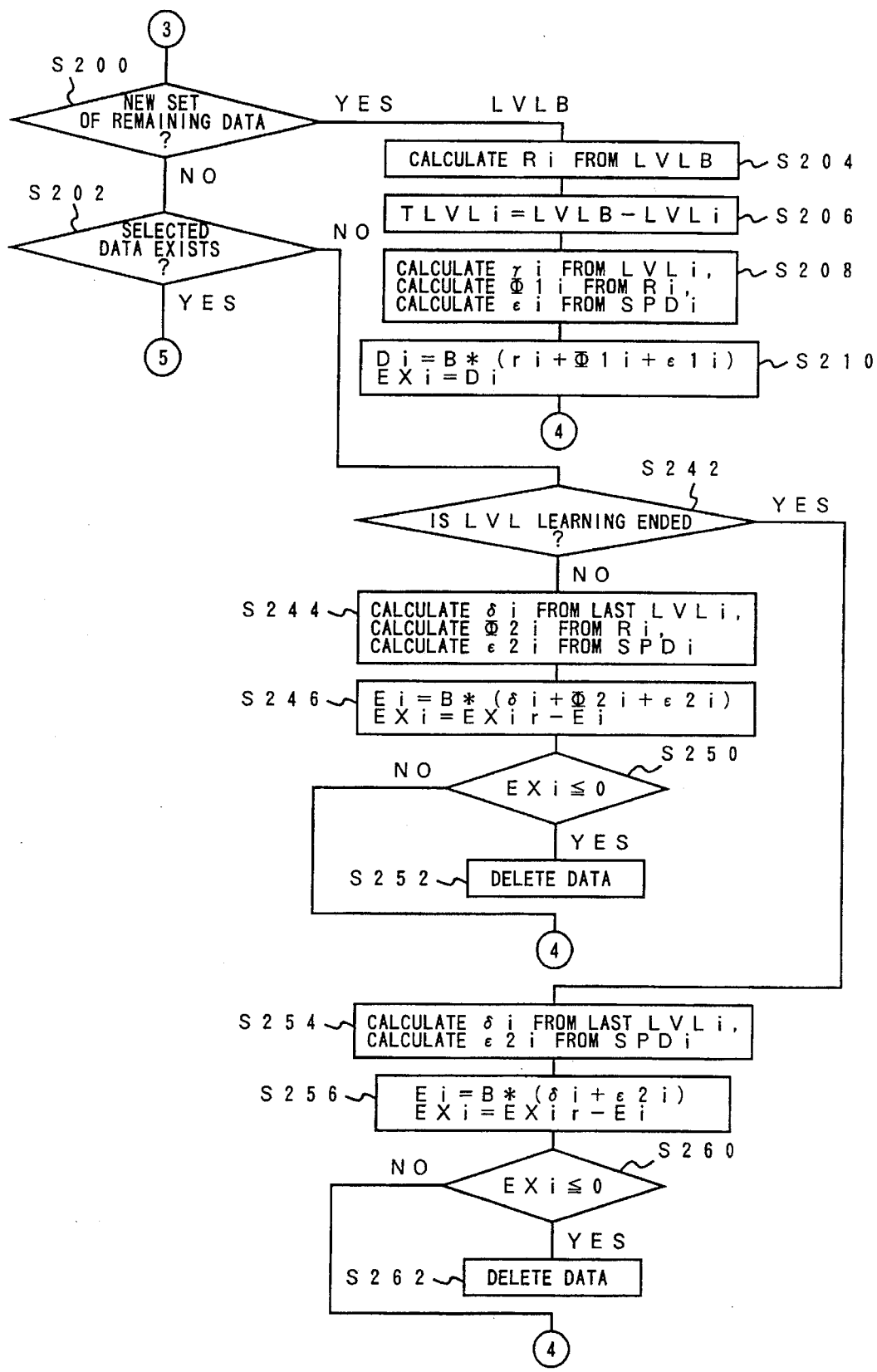
FIGS. 15 and 16 are parts of a flowchart of a third embodiment of the recognizing operation according to the present invention.
Figure 16:
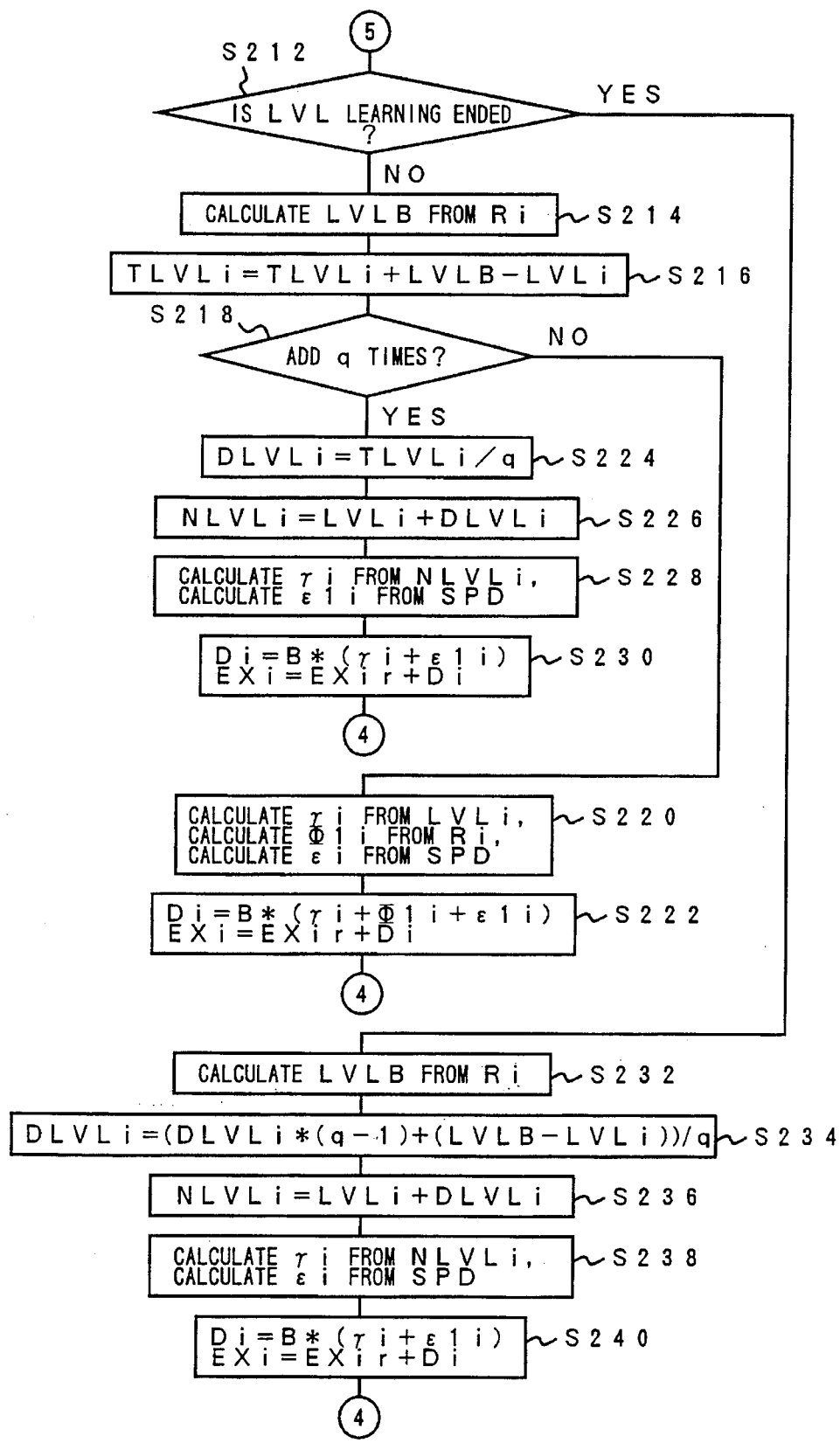

FIGS. 15 and 16 are parts of a flowchart of an operation performed in the third embodiment according to the present invention. The operation shown in FIG. 15 is preformed instead of a part of the operation of the first embodiment shown in FIG. 5.

In step S200 shown in FIG. 15, it is determined whether or not the set of remaining data is the new set of remaining data for all of the sets of remaining data. If one of the sets of remaining data is determined to be the new set of remaining data, that is, if the one of the sets of remaining data corresponds to the target i which has been initially set in the operation currently performed, the routine proceeds to step S204. In step S204, the reference reflection level LVLB is calculated by the relative distance Ri of the set of new data by referring to the map representing the graph shown in FIG. 14. In step S206, a difference TLVLi is obtained by subtracting the reflection level LVLi from the reference reflection level LVLB. Then, a correction factor τi is calculated, in step S208, by the reflection level LVLi by referring to the map representing the graph shown in FIG. 7. Additionally, the correction factor Φ1i is calculated by the relative distance Ri of the set of new data by referring to a map representing the graph shown in FIG. 11. Further, the correction factor ε1i is calculated by the vehicle speed SPD by referring to the map representing the graph shown in FIG. 12. In step S210, the probability of existence EXi is calculated by the equations (10) (EXi=Bx(τi+Φ1i+ε1i), and then the routine proceeds to step S80.

If it is determined, in step S200, that one of the set of remaining data is not the new set of remaining data, the routine proceeds to step S202. It is determined, in step S202, whether or not the set of remaining data is selected by one of the set of new data for all of the sets of remaining data. If it is determined that the set of remaining data is selected by one of the sets of new data, that is, if the set of remaining data corresponds to the target i which has been detected in the previous operation, the routine proceeds to step S212 shown in FIG. 16. In step S212, it is determined whether or not a learning operation for the reflection level LVL has ended. If it is determined that the learning operation has not ended, the routine proceeds to step S214. In step S214, the reference reflection level LVLB is calculated by the relative distance Ri of the set of new data by referring to the map representing the graph shown in FIG. 14. In step S216, the difference between the reflection level LVLi and the reference reflection level LVLB is added to the difference TLVi. It is determined, in step S218, whether or not the addition performed step in S216 has been performed a predetermined number q of times. If the addition has not performed q times, the routine proceeds to step S220. Then, a correction factor τi is calculated, in step S220, by the reflection level LVLi by referring to the map representing the graph shown in FIG. 7. Additionally, the correction factor Φ1i is calculated by the relative distance Ri of the set of new data by referring to a map representing the graph shown in FIG. 11. Further, the correction factor ϵ1i is calculated based on the vehicle speed SPD by referring to the map representing the graph shown in FIG. 12. In step S222, the probability of existence EXi is calculated by the equations (10) (EXi=Bx(τi+Φ1i+ϵ1i)), and then the routine proceeds to step S80.

If it is determined, in step S218, that the addition has been performed q times, the routine proceeds to step S224. In step S224, an average value DLVLi is obtained by dividing TLVLi by q. The reflection level LVLi is then added, in step S226, to the reflection level LVLi of the set of new data so as to obtain a corrected reflection level NLVLi. By this operation, the learning operation for the reflection level is ended. Thereafter, the correction factor τi is calculated, in step S228, by the reflection level LVLi by referring to the map representing the graph shown in FIG. 7. Additionally, the correction factor ϵ1i is calculated based on the vehicle speed SPD by referring to the map representing the graph shown in FIG. 12. In step S230, the probability of existence EXi is calculated by the following equations (13), and then the routine proceeds to step S80.

$$Ei=Bx(\tau i+\epsilon 1i), EXi=EXir+Di \quad (13)$$

On the other hand, if it is determined, in step S212, that the learning operation is ended, the routine proceeds to step S232. In step S232, the reference reflection level LVLB is calculated by the relative distance Ri of the set of new data by referring to the map representing the graph shown in FIG. 14. Then, in step S234, the average value DLVLi is updated by a calculation using the following equation (14).

$$DLVLi=(DLVLix(q-1)+(LVLB-LVLi))/q \quad (14)$$

In step S236, the corrected reflection level NLVLi is obtained by adding DLVLi to the reflection level LVLi of the set of new data. Then, a correction factor τi is calculated, in step S238, by the reflection level NLVLi by referring to the map representing the graph shown in FIG. 7. Additionally, the correction factor ϵ1i is calculated based on the vehicle speed SPD by referring to the map representing the graph shown in FIG. 12. In step S240, the probability of existence EXi is calculated by the equations (13), and then the routine proceeds to step S80.

If it is determined, in step S202 of FIG. 15, that the set of remaining data is selected by none of the sets of new data, that is, if the target i is lost, the routine proceeds to step S242. In step S242, it is determined whether or not the learning operation for the reflection level LVL has ended. If it is determined that the learning operation has not ended, the routine proceeds to step S244. In step S244, the correction factor δi is calculated by the reflection level LVLi stored in the last operation by referring to the map representing the graph shown in FIG. 8. Additionally, the correction factor Φ2i is calculated from the relative distance Ri of the set of new data by referring to a map representing the graph shown in FIG. 11. Further, the correction factor ϵ2i is calculated by the vehicle speed SPD by referring to the map representing the graph shown in FIG. 12. Then, the routine proceeds to step S246 so as to calculate the probability of existence EXi by the equations (12). Thereafter, in step S250, it is determined whether or not EXi calculated by the equations (12) is equal to or less than 0. If EXi is equal to or less than 0, the routine proceeds to step S252 so as to delete the set of remaining data corresponding to the target i. If EXi is greater than 0, the routine proceeds to step S80.

If it is determined, in step S242, that the learning operation has ended, the routine proceeds to step S254. In step S254, the correction factor δi is calculated by the reflection level LVLi stored in the last operation by referring to the map representing the graph shown in FIG. 8. Additionally, the correction factor ϵ2i is calculated from the vehicle speed SPD by referring to the map representing the graph shown in FIG. 12. Then, the routine proceeds to step S256 so as to calculate the probability of existence EXi by the following equations (15).

$$Ei=Bx(\delta i+\epsilon 2i), EXi=EXir-Ei \quad (15)$$

Thereafter, in step S260, it is determined whether or not EXi calculated by the equations (15) is equal to or less than 0. If EXi is equal to or less than 0, the routine proceeds to step S262 so as to delete the set of remaining data corresponding to the target i. If EXi is greater than 0, the routine proceeds to step S80.

Proximating the reflection level of all vehicles to the reference reflection level is not only meaningful in the correction by the relative distance R but also meaningful in the addition of the average value DLVL to the reflection level LVL. This is because the reflection level is not always constant with respect to the relative distance R in an actual condition due to undesired conditions such as a multi-path. Thus, the capability of the sensor is reflected in the calculation of the probability of existence by adding the average value DVLV to the reflection level LVL. The above-mentioned steps S210, S222, S230, S240, S246 and S256 correspond to the certainty level calculating means M2.

Figure 17:
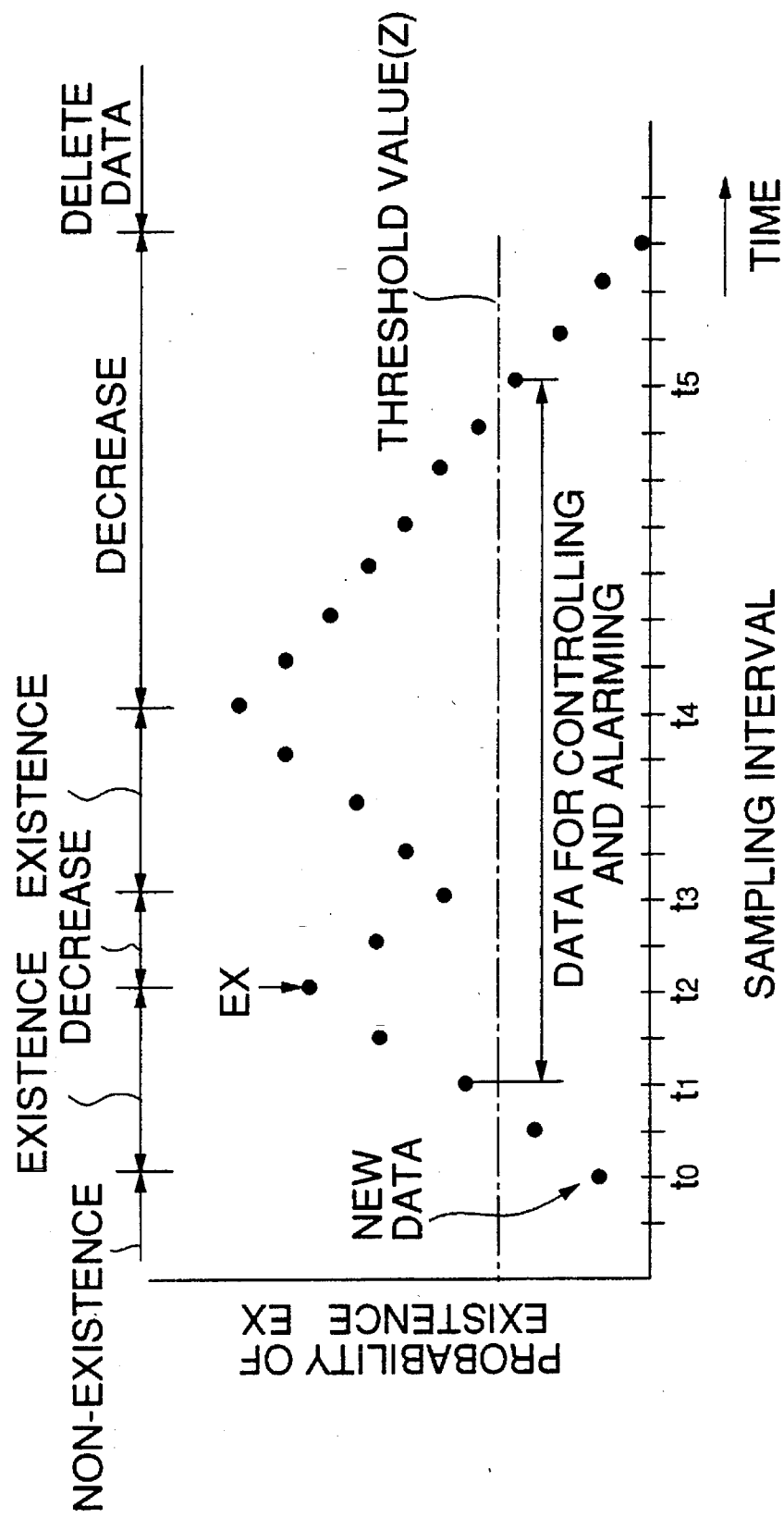
FIG. 17 is a graph showing variation of probability of existence with respect to elapsed time.

FIG. 17 is a graph showing a variation of the probability of existence with respect to elapsed time. In the graph shown in FIG. 17, a target object is initially detected at the time t0. The probability of existence of the target object is increased as the time elapses. That is, the probability of existence EX increases in duration from t0 to t2. However, when the target object is lost, the probability EX is decreased as shown in the duration from t2 to t3. Since the target object is detected again at time t3, the probability EX is increased again in the duration from t3 to t4. The target object is lost again at time t4, and thus the probability EX is decreased. The probability EX is finally decreased to 0 when the time period, in which the target object is lost, lasts for a long period. In the graph shown in FIG. 17, the probability EX exceeds the predetermined threshold value Z in the duration from t1 to t5. Thus, the target object is an object for alarming during the time period from t1 to t5.

In the above-mentioned embodiment, the probability of existence of the target object is corrected in accordance with the detection level of the target object. However, in other applications, when malfunctioning occurs in the radar apparatus and if the malfunctioning is not serious, the correction value may be set to a small value. If the malfunctioning is serious, the correction value may be set to a large value.

Figure 18:
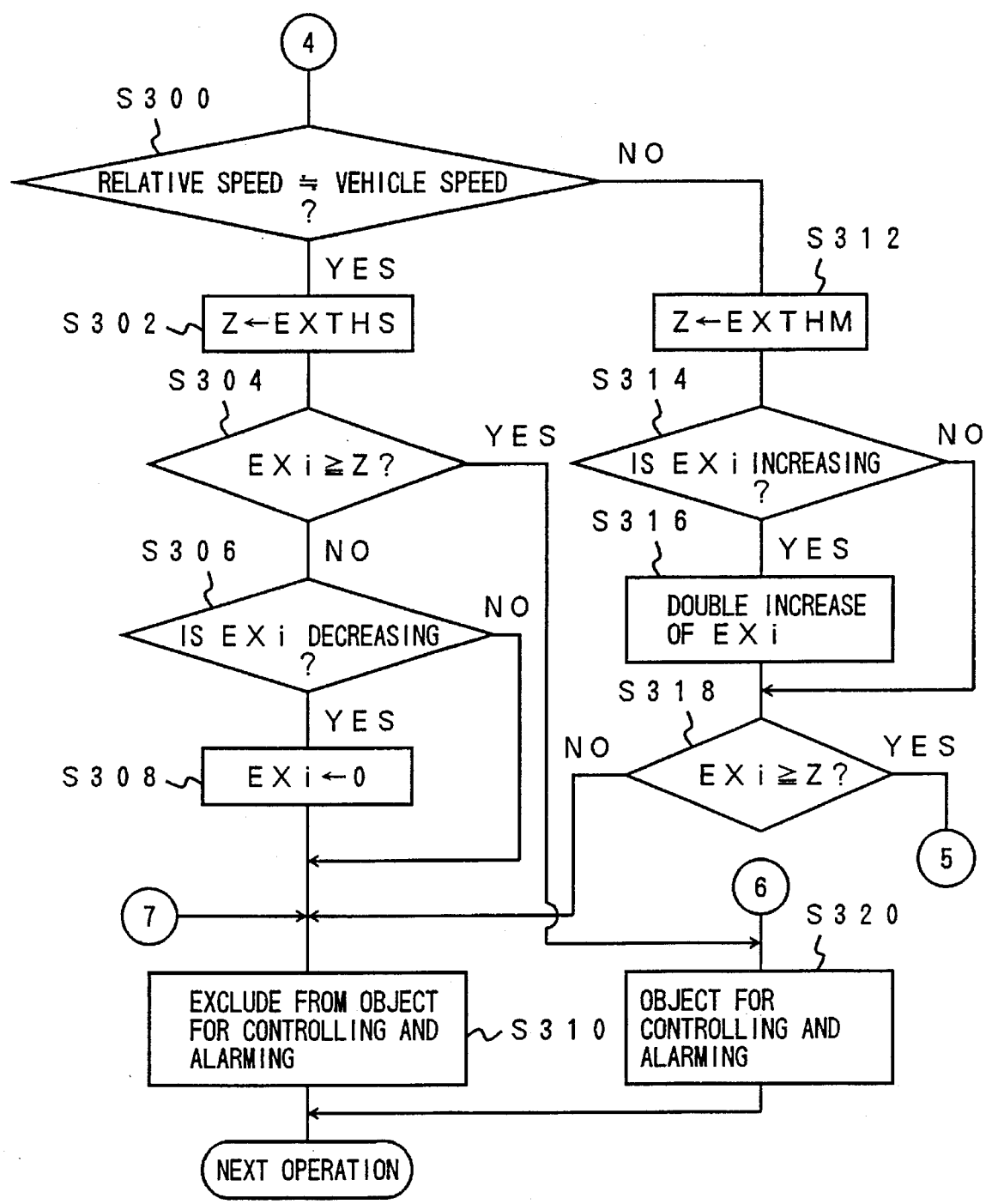
FIGS. 18 and 19 are parts of a flowchart of a fourth embodiment of the recognizing operation according to the present invention.
Figure 19:
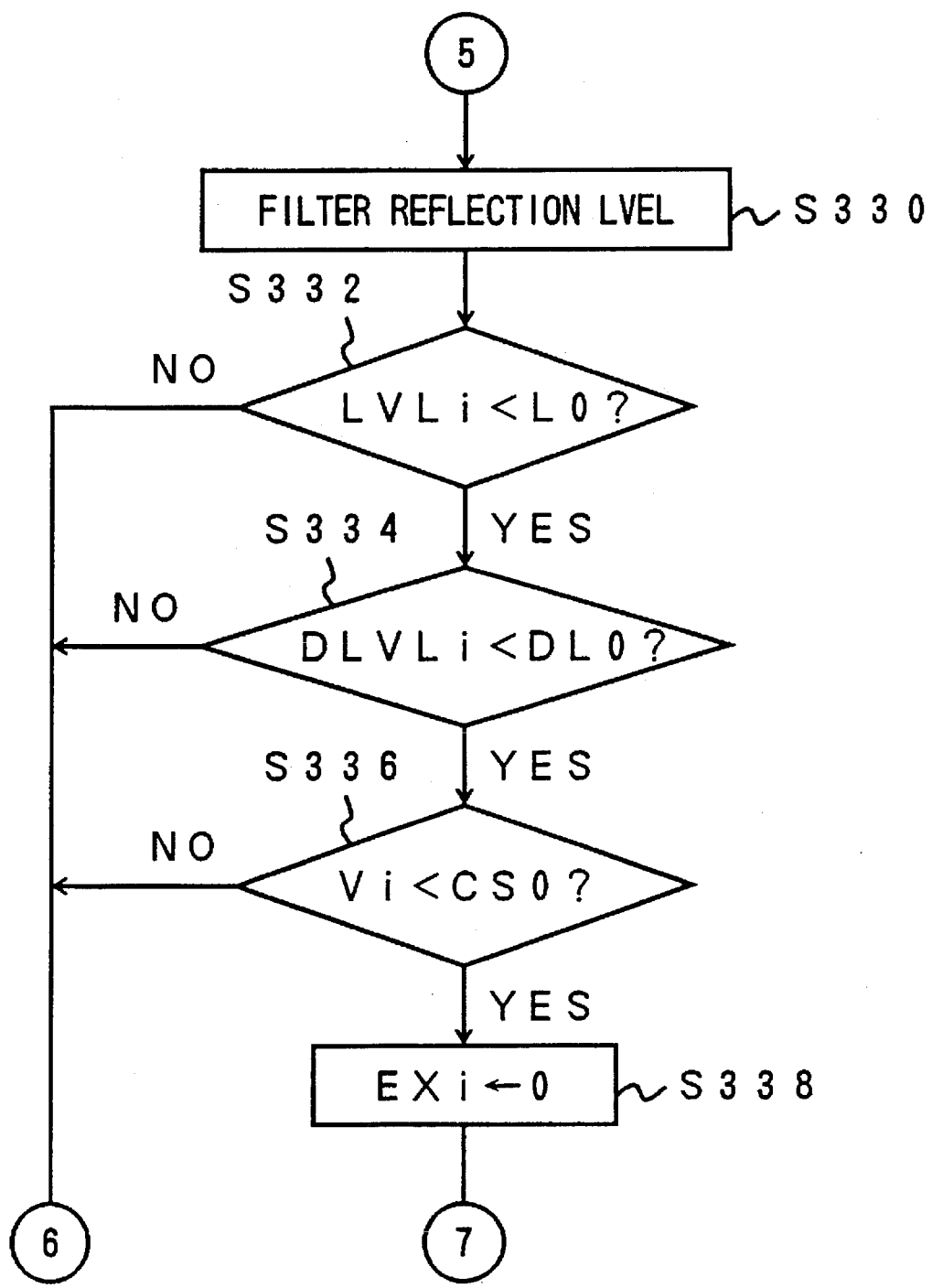

FIGS. 18 and 19 are parts of a flowchart of a fourth embodiment of the recognizing operation according to the present invention. The operation shown in FIGS. 18 and 19 is performed instead of the part of the operation of the first embodiment shown in FIG. 6.

In step S300 shown in FIG. 18, it is determined whether the relative speed Vi is nearly equal to the vehicle speed Vs. That is, whether or not the relative speed Vi falls within a narrow range of the vehicle speed Vs. If the relative speed Vi is nearly equal to the vehicle speed Vs, the target object i is considered to be an object which is not moving, and then the routine proceeds to step S302. In step S302, a high setting value EXTHS (for example, 80%) is set to the threshold value Z.

In step S304, it is determined whether or not the probability of existence is equal to or greater than the threshold value Z. If the probability of existence is equal to or greater than the threshold value Z, the routine proceeds to step S320. In step S320, the target object i is set as a target for controlling and alarming, and the routine proceeds to the next operation. On the other hand, if the probability EXi is smaller than the threshold value Z, the routine proceeds to step S306 so as to determine whether or not the probability EXi is decreasing. If the probability decreases a predetermined number of times, the routine proceeds to step S308. In step S308, the probability of existence EXi of the target object i is forcibly set to 0, and then the routine proceeds to step S310. If the probability does not decrease the predetermined number of times, the routine proceeds to step S310. In step S310, the target object i is excluded from the targets for controlling and alarming, and then the routine proceeds to a next operation.

If it is determined, in step S300, that the relative speed is different from the vehicle speed Vs, the target object i is determined as an object which is moving, and then the routine proceeds to step S312. In step S312, a medium setting value EXTHM (for example, 50%) is set to the threshold value Z. Then, it is determined, in step S314, whether or not the probability EXi is increasing. If the probability increases a predetermined number of times, the routine proceeds to step S316. In step S316, Ai calculated in step S70 or the Di calculated in S110 is added to the probability of existence EXi of the target object. By this operation, the increase Ai or Di of the probability EXi is doubled. Thereafter, the routine proceeds to step S318. If it is determined, in step S314, that the probability EXi is not increasing, the routine directly proceeds to step S318.

In step S318, it is determined whether or not the probability of existence EXi is equal to or greater than the threshold value Z. If the probability of existence is equal to or greater than the threshold value Z, the routine proceeds to step S330 shown in FIG. 19. On the other hand, if the probability EXi is smaller than the threshold value Z, the routine proceeds to step S310 in which the target object i is excluded from the targets for controlling and alarming, and then the routine proceeds to the next operation.

Figure 20A:
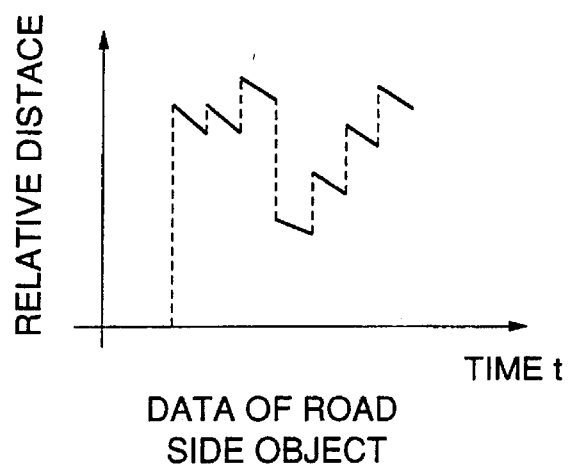
FIGS. 20A and 20B are graphs showing change in the relative distance with respect to elapsed time.
Figure 20B:
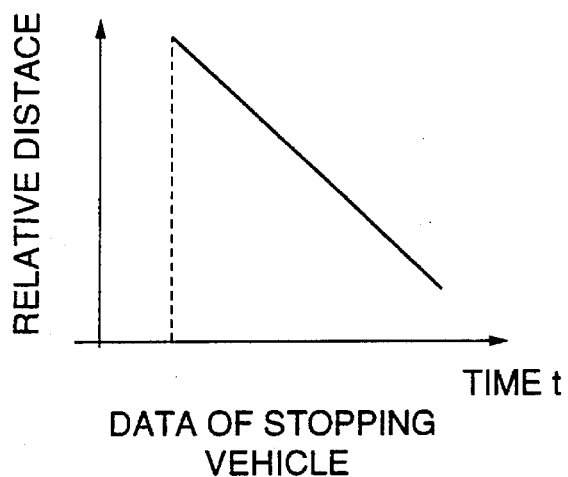

The object, which is considered not to be moving, includes a road side object which unnecessary reflects the radar beam and an obstacle such as a vehicle which is stopped in the same lane. Data of the relative distance corresponding to most road side objects form a discontinuous lines as shown in FIG. 20A. On the contrary, data of the relative distance corresponding to most of the vehicles stopped in the same lane forms a continuous line as shown in FIG. 20B, the relative distance being decreased as time elapses.

Accordingly, in the case of the road side object, the probability of existence EXi starts to decrease before the probability EXi exceeds the threshold value Z. On the other hand, in the case of a vehicle stopped in the same lane, the probability of existence EXi continues to increase with respect to elapsed time as long as the vehicle is approaching. Accordingly, when it is determined, in step S306, that the probability EXi is decreasing, the target object i is considered to be a road side object. In the following step S308, the probability of existence EXi of the road side object is forcibly set to 0 so that a road side object is surely excluded from the targets track.

When the object is moving, the threshold value Z is set, in step S312, to be the medium setting value EXTHM so as to prevent the target object i from being excluded from the object for controlling and alarming. Additionally, the increase in the probability EXi is doubled in step S316 while the probability is increasing so as to prevent a delay in response until the target object i is considered to be the object for controlling and alarming.

Figure 21A:
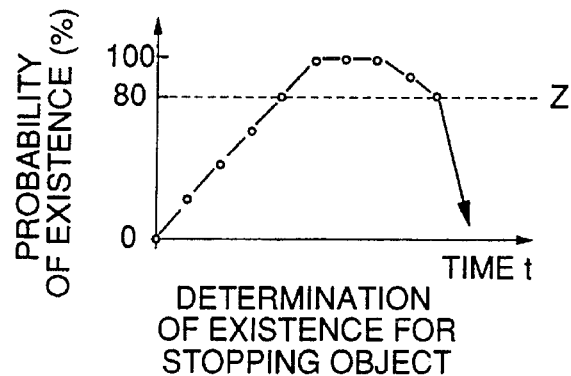
FIGS. 21A and 21B are graphs showing variation in probability of existence with respect to elapsed time.
Figure 21B:
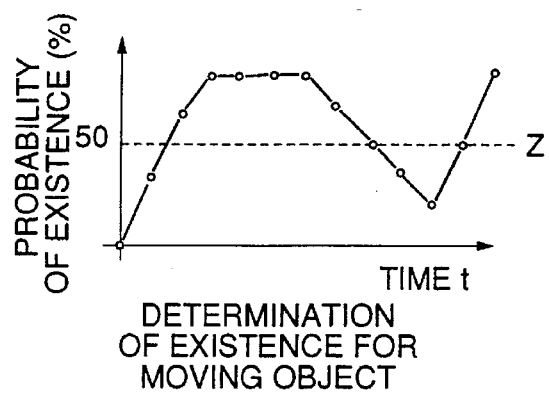

FIG. 21A is a graph showing a variation of probability of existence of a stopping object with respect to elapsed time. FIG. 21B is a graph showing a variation of probability of existence of a moving object with respect to elapsed time. In those graphs, the threshold value Z is indicated by a dashed line. The data corresponding to the object for controlling and alarming is represented by circles in black. The data corresponding to the object excluded form the object for controlling and alarming is represented by blank circles.

Figure 22:
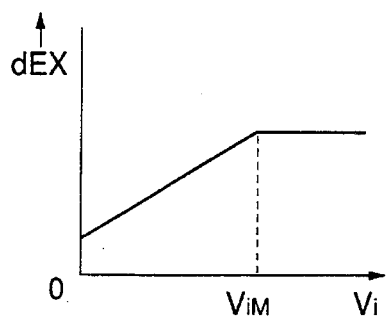
FIG. 22 is a graph showing a relationship between a differential value of the probability of existence and the relative speed.

In the embodiment shown in FIG. 18, when the target object is a moving object and when the probability of existence EXi is increasing, the increase of the probability EXi is doubled in step S316. In an alternative, an increase dEX may be added to the probability EXi by obtaining the increase dEX by the relative speed VI by referring to a map representing a graph shown in FIG. 22. In the graph shown in FIG. 22, the increase dEX is increased as the relative speed Vi is increased until the relative speed reaches ViM. The relative speed Vi represents an approaching speed of the target object i. The increasing rate of the probability EXi is increases as the approaching speed of the target object i is increased.

In step S330 shown in FIG. 19, the reflection level LVL of the consecutive sets of data with respect to elapsed time is subjected to filtering by a low-band digital filter. This is because a rate of change in the reflection level of the target object is too high with respect to elapsed time. It is then determined, in step S332, whether or not the reflection level LVLi of the target object i is less than a threshold value L0.

If the reflection level LVLi of the target object i is less than the threshold value (L0LVLi<L0), the routine proceeds to step S334. In step S334, it is determined whether or not the rate of change DLVLi of the target object i is less than a threshold value DL0. If the rate of change DLVLi of the target object i is less than the threshold value DL0 (DLVLi<DL0), the routine proceeds to step S336. In step S336, it is determined whether or not the relative speed Vi is less than a threshold value CS0 which is a negative value. That is, it is determined whether or not the target object i is moving away. This is because if the relative speed Vi is a positive value, this means the target object i is approaching. If it is determined, in step S336, that the relative speed Vi is less than a threshold value CS0 (Vi<CS0), the routine proceeds to step S338 so as to forcibly set the probability of existence to 0. Thereafter, in step S310 shown in FIG. 18, the target object i is excluded from the object for controlling and alarming, and then the routine proceeds to the next operation. That is, when the reflection level is less than a predetermined level and when the reflection level is rapidly decreasing and when the target object is moving away, it is determined that the target object has moved to an adjacent lane.

On the other hand, if it is determined, in step S332, that the reflection level LVLi of the target object i is not less than the threshold value L0, the routine proceeds to step S320 shown in FIG. 18. Additionally, if the rate of change DLVLi of the target object i is not less than the threshold value DL0, the routine proceeds to step S320. Similarly, if it is determined, in step S336, that the relative speed Vi is not less than the threshold value CS0, the routine proceeds to step S320. In step S320, the target object i is set as the object for controlling and alarming, and then the routine proceeds to the next operation. The above-mentioned steps S332 to S338 correspond to the first certainty level decreasing means M3. The probability of existence EXi changed in step S388 corresponds to the certainty level.

Figure 23:
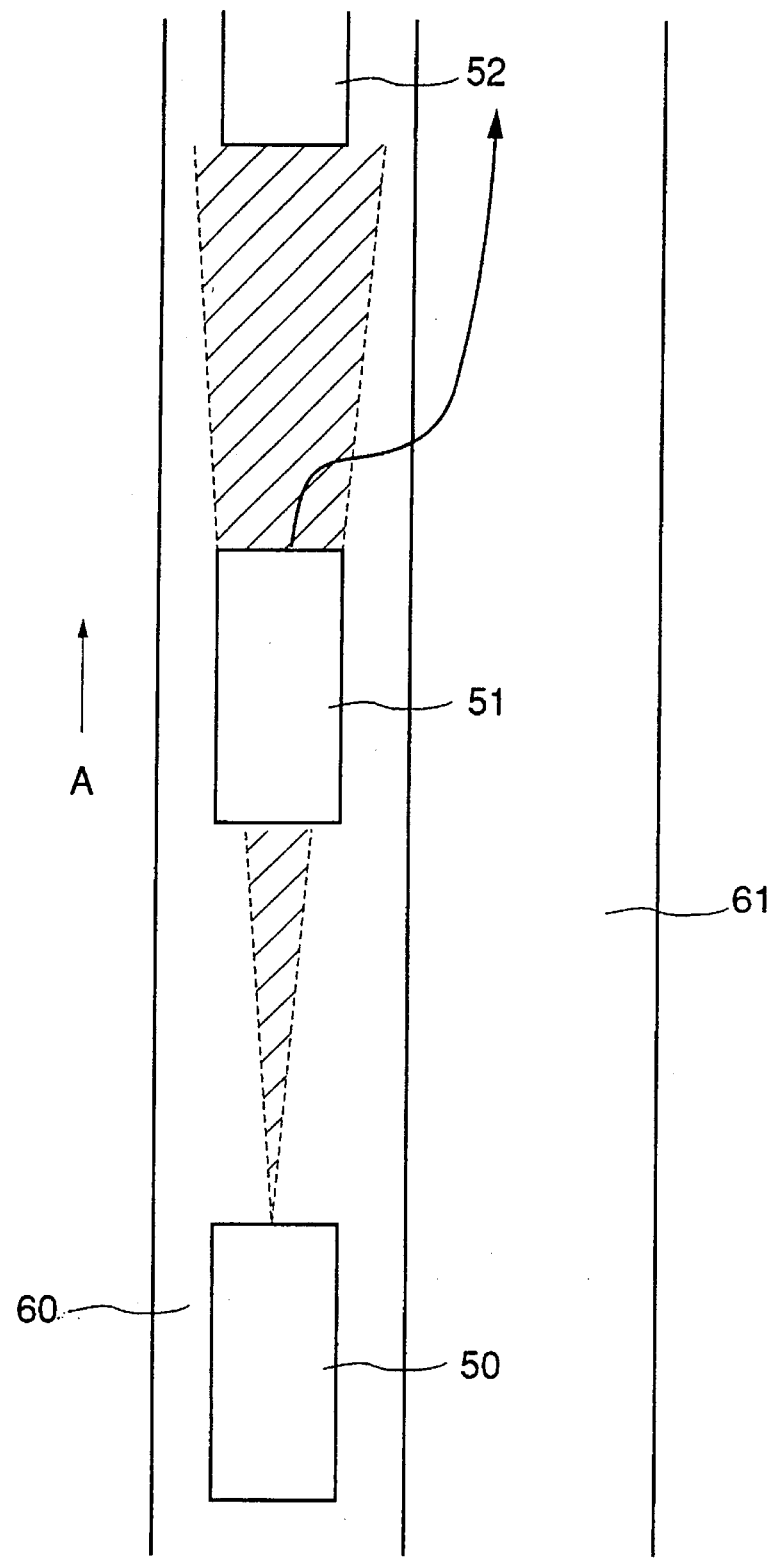
FIG. 23 is an illustration for explaining a condition in which a vehicle in front changes a lane.
Figure 24:
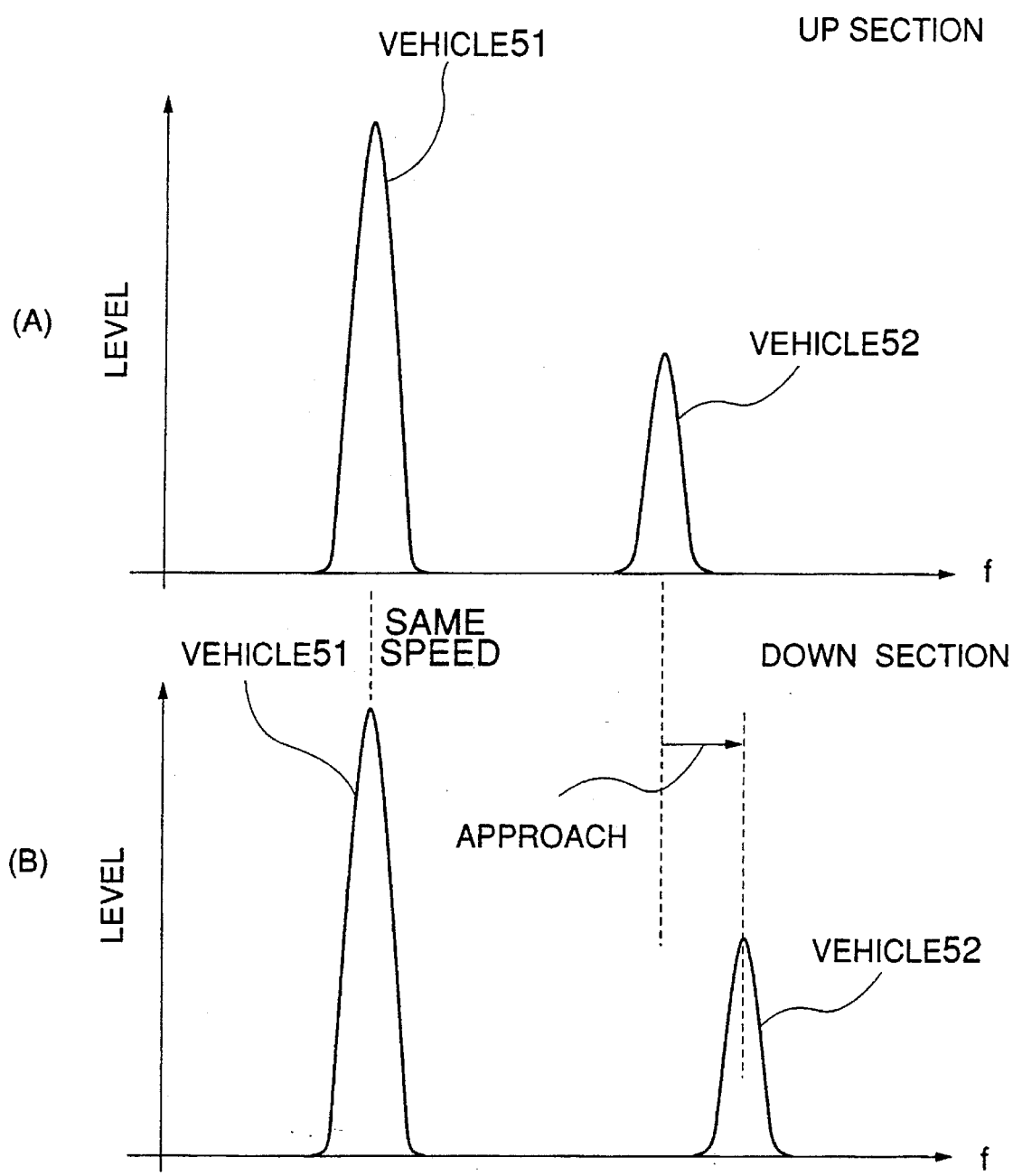
FIG. 24 is an illustration for explaining a condition before the vehicle in front changes the lane.
Figure 25:
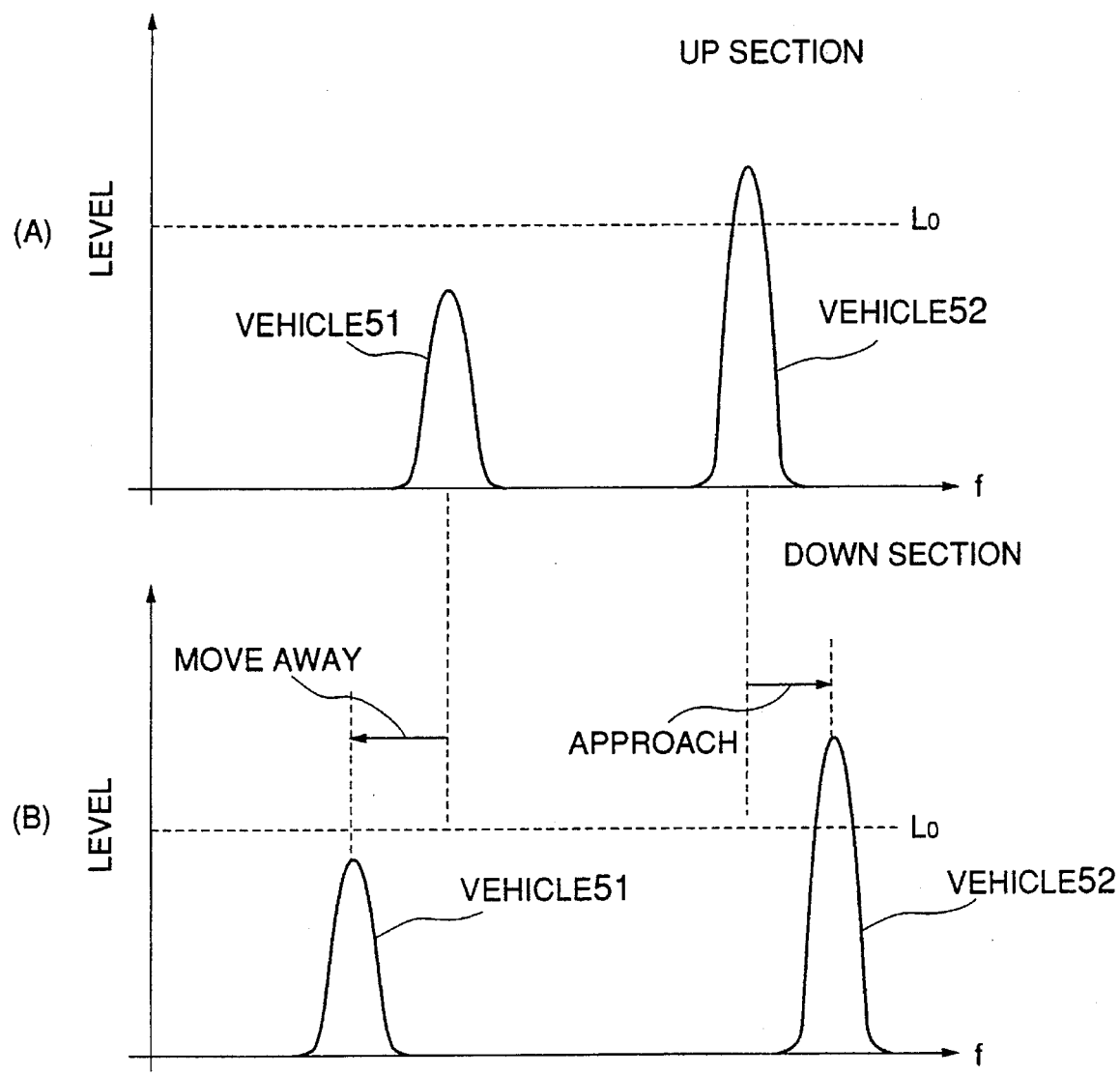
FIG. 25 is an illustration for explaining a condition after the vehicle in front has changed the lane.

FIG. 23 is an illustration for explaining a condition in which a vehicle in front passes another vehicle in the same lane. In FIG. 23, vehicles 52, 51 and 50 are moving in the same lane 60 in a direction indicated by an arrow A. The vehicle 50 has a radar apparatus. It is assumed that the vehicle 51 moves to an adjacent lane 61 so as to pass the vehicle 52. Before the vehicle 51 moves to the lane 61, the peaks of the power spectrum corresponding to the vehicle 51 in the frequency increasing part (up section) and the frequency decreasing part (down section) indicate that there is no change in the relative speed as shown in FIG. 24. FIG. 24-(A) shows the peaks in the up section, and FIG. 24-(B) shows the peaks in the down section. The peaks corresponding to the vehicle 52 indicate that the vehicle 52 is approaching the vehicle 50. FIG. 25 shows peaks corresponding to the vehicles 51 and 52 after the vehicle 51 has moved to the adjacent lane 61. In FIG. 25, the peak corresponding to the vehicle 51 indicates that the vehicle 51 is moving away from the vehicle 50. Additionally, the peak corresponding to the vehicle 52 indicates that the vehicle 52 is approaching the vehicle 50.

Additionally, comparing the peaks shown in FIG. 24 and that shown in FIG. 25, the reflection level of the vehicle 51 decreases after the vehicle 51 has moved to the adjacent lane 61. On the contrary, the reflection level of the vehicle 52 increases after the vehicle has moved to the adjacent lane 61 since the vehicle 51 does not block the radar beam any more. Accordingly, it is apparent that the conditions of the steps S332, S334 and S336 are satisfied when the vehicle 51, which is moving in front of the vehicle 50, changes the lane.

Figure 26:
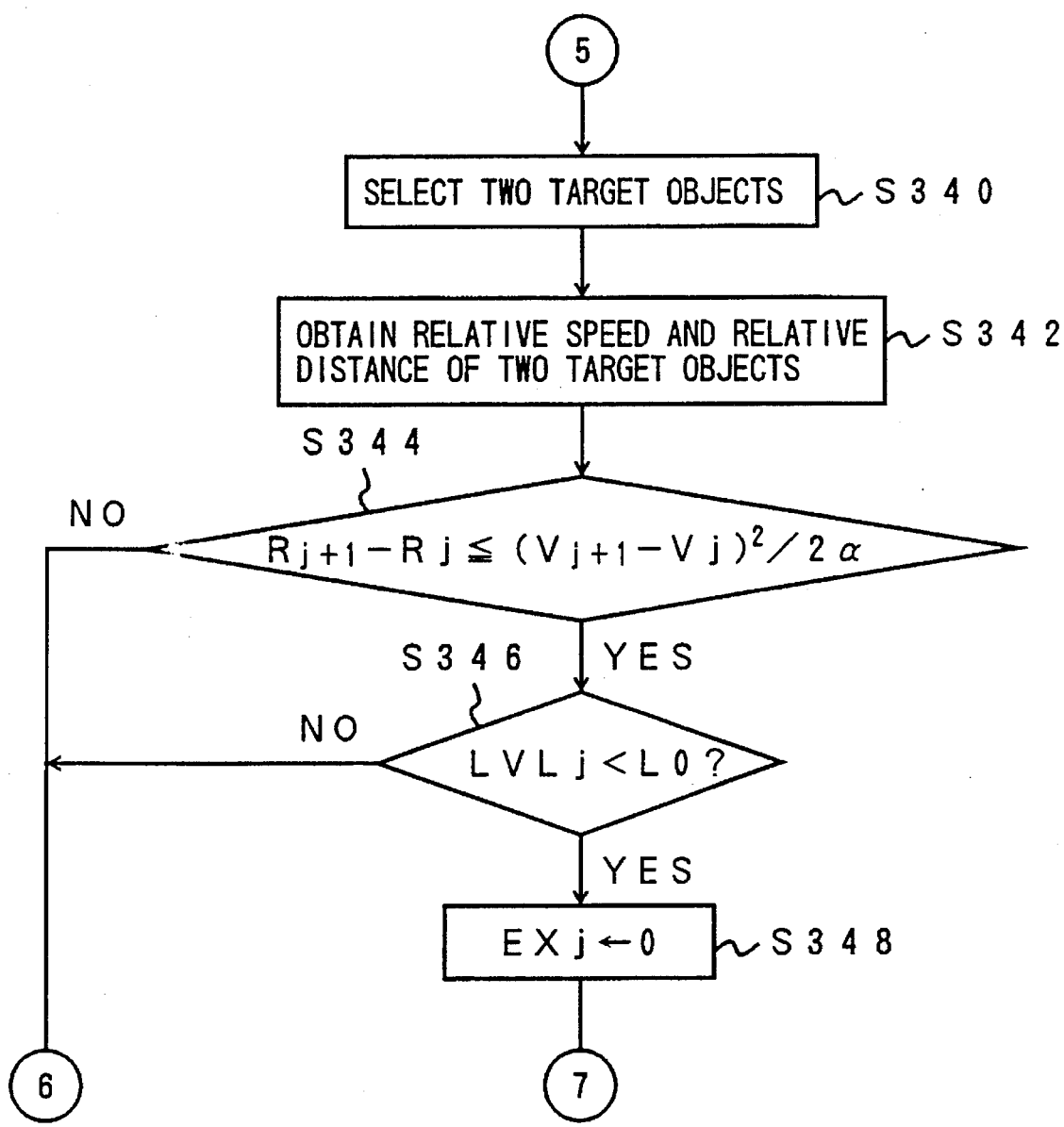
FIG. 26 is a part of a flowchart of a fifth embodiment of the recognizing operation according to the present invention.

FIG. 26 is a flowchart of a part of a recognizing operation performed in a fifth embodiment according to the present invention. The operation shown in FIG. 26 is performed instead of the operation shown in FIG. 19.

In FIG. 26, two target objects j and j+1 are selected, in step S340, from among a plurality of target objects within the detection range of the radar apparatus. The two target objects j and j+1 are the first and second closest objects. Thereafter, in step S342, the relative speed Vj and Vj+1 and the relative distance Rj and Rj+1 are obtained from the remaining data, respectively.

The approaching speed ((Vj+1)−Vj) and the relative distance ((Rj+1)−Rj) of the second closest target object with respect to the first closest target object is obtained. It is then determined, in step S344, whether or not the following relationship (16) is satisfied.

$$(Rj+1) - Rj \leq ((Vj+1) - Vj)^2 / 2\alpha \quad (16)$$

Where $\alpha$ is a relative acceleration, for example, 1G.

If the relationship (16) is satisfied, the target object j will collide with the target object j+1, or the target object j will pass the target object j+1. Accordingly, if the relationship (16) is satisfied, the routine proceeds to step S346. In step S346, it is determined whether or not the reflection level LVLVj of the target object j is less than the threshold value L0. If it is determined that the reflection level LVLVj of the target object j is less than the threshold value L0, it is determined that the target object j changes lanes. The routine proceeds to step S348 so as to forcibly set the probability of existence EXj to 0. Thereafter, in step S310 shown in FIG. 18, the target object j is excluded from the object for controlling and alarming, and then the routine proceeds to the next operation.

On the other hand, if it is determined, in step S344, that the relationship (16) is not satisfied, or if the it is determined, in step S346, that the reflection level LVLVj of the target object j is not less than the threshold value L0, the routine proceeds to step S320 shown in FIG. 18. In step S320, the target object j is set as the object for controlling and alarming, and then the routine proceeds to the next operation. The above-mentioned steps S344 to S348 correspond to the second certainty level decreasing means M4. The probability of existence EXi changed in step S348 corresponds to the certainty level.

The above-mentioned operation is suitable for tracking the vehicle in front. That is, when the closest vehicle moving in front changes lanes, the target to track can be immediately switched to the next closest vehicle in front. In the above-mentioned operation, two target objects, which are the nth order and (n+1)th order closest to the vehicle, may be selected as the target objects j and j+1 so as to exclude the nth order target object when it moves to another lane. In such a case, the target object which is no longer the object to track can be expected and excluded at an earlier stage.

Figure 27:
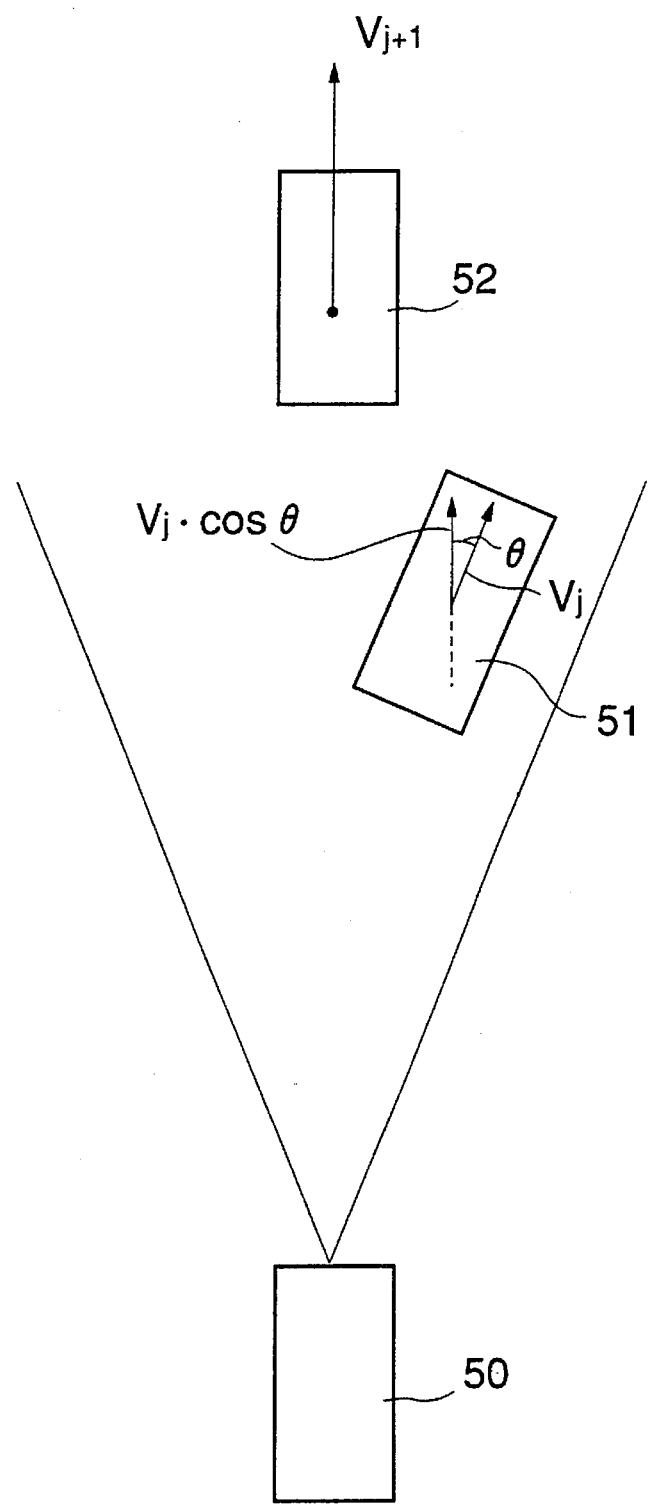
FIG. 27 is an illustration for explaining a condition in which a vehicle in front changes a lane.

The relative speed Vj+1 of the vehicle 52, which is moving in a projection direction of the radar beam, is equal to the differential value of the relative distance Rj+1. However, if the vehicle 51 moves in a direction having an angle $\Theta$ different from the projection direction, the relative speed Vj of the vehicle j becomes less than the differential value DRi of the relative distance Rj of the vehicle j. This is because the component of the relative speed Vj in the projection direction of the radar beam becomes vj·cos$\Theta$ as shown in FIG. 27. Accordingly, the determination in step S336 shown in FIG. 19 can be replaced with the operation in which it is determined whether or not the differential value DRj of the relative distance Rj of the target object j is greater than the relative speed Vj of the target object j. In this case, if the differential value Rj is greater than the relative speed Vj, the routine proceeds to step S338. If the differential value Rj is not greater than the relative speed Vj, the routine proceeds to step S320. In this case, the steps S336 and S338 correspond to the third certainty level decreasing means M5.

In the above-mentioned operation, a lane changing operation of the vehicle in front can be recognized since the vehicle in front has a component of speed in direction different from the projection direction of the radar beam. Thus, the target object moving to another lane can be positively recognized so as to exclude the target object from the object for controlling and alarming.

The present invention is not limited to the specifically disclosed embodiments, and variations and modifications may be made without departing from the scope of the present invention.

What is claimed is:

1. A vehicle radar, provided on a vehicle, to calculate a relative distance and a relative speed between said vehicle and each of a plurality of target objects by transmitting forwardly a frequency modulated carrier wave and receiving the carrier wave reflected by each of said target objects, said vehicle radar comprising:

certainty level calculating means for calculating a certainty level, represented by probability of existence of said target objects, the certainty level being calculated based on a relationship between a current condition of detection of each of said target objects and a previous condition of detection of each of said target objects; and certainty level changing means for changing the certainty level of one of said target objects when a determination is made that said one of said target objects moves away from a lane in which said vehicle is moving so that said one of said target objects are excluded from targets to track.

2. The vehicle radar as claimed in claim 1, wherein said determination is made based on a reflection level of the carrier wave reflected by each of said target objects.

3. The vehicle radar as claimed in claim 2, wherein said certainty level changing means comprises first certainty level decreasing means for decreasing the certainty level of said one of said target objects, and said determination is made when the reflection level of said one of said target objects is less than a predetermined value and when a rate of change in the reflection level of said one of said target objects is less than a first predetermined negative value and when the relative speed between said one of said target objects and said vehicle is less than a second predetermined negative value, said rate of change being a negative value when the reflection level is decreasing, said relative speed being a negative value when said one of said target objects moves away from said vehicle.

4. The vehicle radar as claimed in claim 3, wherein said first certainty level decreasing means sets the certainty level of said one of said target objects calculated by said certainty level calculating means to be equal to zero when said determination is made.

5. The vehicle radar as claimed in claim 2, wherein said determination is made based on the reflection level of said one of said target objects and the reflection level of another one of said target objects, said one of said target objects being positioned between said another one of said target objects and said vehicle.

6. The vehicle radar as claimed in claim 5, wherein said first one of said target objects is closest to said another one of said target objects among said target objects.

7. The vehicle radar as claimed in claim 5, wherein said certainty level changing means comprises second certainty level decreasing means for decreasing the certainty level of said one of said target objects when a determination is made that said first one of said target objects approaches said another one of said target objects within a predetermined distance.

8. The vehicle radar as claimed in claim 7, wherein said determination is made based on relative distance and relative speed of said one of said target objects and said another one of said target objects.

9. The vehicle radar as claimed in claim 8, wherein said first one of said target objects is closest to said vehicle among said target objects.

10. The vehicle radar as claimed in claim 9, wherein said second certainty level decreasing means sets the certainty level of said one of said target objects calculated by said certainty level calculating means to be equal to zero when said determination is made.

11. The vehicle radar as claimed in claim 2, wherein said certainty level changing means comprises third certainty level decreasing means for decreasing the certainty level of one of said target objects when a determination is made that a differential value of the relative distance of said one of said target objects is greater than a relative speed of said one of said target objects.

12. The vehicle radar as claimed in claim 11, wherein said third certainty level decreasing means sets the certainty level of said one of said target objects calculated by said certainty level calculating means to be equal to zero when said determination is made.

* * * * *

UNITED STATES PATENT AND TRADEMARK OFFICE
CERTIFICATE OF CORRECTION

PATENT NO : 5,612,699

DATED : March 18, 1997

INVENTOR(S) : Yukinori YAMADA

It is certified that error appears in the above-indentified patent and that said Letters Patent is hereby corrected as shown below ABSTRACT, line 1, change "includes" to --excludes--.

ABSTRACT, line 2, after "target" insert --to track--.

Column 2, line 14, change "o" at end of line to --to--.

Column 4, line 16, change "generates" to --generate--.

Column 7, line 13, change "T1" to --$\tilde{T}_1$--.

Column 7, line 18, change "T" to --$\tilde{T}$--.

Column 7, line 24, change "$\hat{T}$" to --$\tilde{T}$--.

Column 7, line 35, after "one" insert --of--.

Column 7, line 38, change "T" to --$\tilde{T}$--.

Column 7, line 45, change "$\hat{T}$" to --$\tilde{T}$--.

Column 7, line 54, change "show" to --shown--.

Column 7, line 59, change "a" to --as--.

Column 11, line 10, change "step in" to --in step--.

Column 13, line 53, change "On" to --On--.

UNITED STATES PATENT AND TRADEMARK OFFICE
CERTIFICATE OF CORRECTION

PATENT NO. : 5,612,699
DATED : March 18, 1997
INVENTOR(S) : Yukinori YAMADA

It is certified that error appears in the above-indentified patent and that said Letters Patent is hereby corrected as shown below:

Column 13, line 59, change "unnecessary" to --unnecessarily--.

Column 13, line 62, delete "a".

Column 14, line 12, change "targets" to --targets'--.

Column 14, line 28, change "form" to --from--.

Column 14, line 41, change "increases" to --increased--.

Column 14, line 62, "If it is determined," should start a new paragraph.

Column 16, line 18, delete "the" after "if".

Signed and Sealed this

Third Day of February, 1998

BRUCE LEHMAN

Attest:

Attesting Officer

Commissioner of Patents and Trademarks